US008428274B2

(12) United States Patent
Shiraishi et al.

(10) Patent No.: US 8,428,274 B2
(45) Date of Patent: Apr. 23, 2013

(54) APPARATUS AND METHOD FOR DETECTING ACOUSTIC FEEDBACK

(75) Inventors: Goro Shiraishi, Tokyo (JP); Kohei Asada, Kanagawa (JP)

(73) Assignee: Sony Corporation, Tokyo (JP)

( * ) Notice: Subject to any disclaimer, the term of this patent is extended or adjusted under 35 U.S.C. 154(b) by 805 days.

(21) Appl. No.: 12/493,441

(22) Filed: Jun. 29, 2009

(65) Prior Publication Data

US 2010/0002891 A1 Jan. 7, 2010

(30) Foreign Application Priority Data

Jul. 1, 2008 (JP) ................................ 2008-171937

(51) Int. Cl.
*H04B 15/00* (2006.01)

(52) U.S. Cl.
USPC ........... 381/93; 381/83; 381/318; 379/406.01

(58) Field of Classification Search .................... 381/93, 381/83, 66, 95, 96, 318, 74, 309, 71.6, 98; 379/406.01–406.16
See application file for complete search history.

(56) References Cited

U.S. PATENT DOCUMENTS

| | | | | |
|---|---|---|---|---|
| 6,317,703 | B1 * | 11/2001 | Linsker | 702/190 |
| 6,404,895 | B1 * | 6/2002 | Weidner | 381/318 |
| 7,664,275 | B2 * | 2/2010 | Osmanovic et al. | 381/93 |
| 2002/0071573 | A1 * | 6/2002 | Finn | 381/93 |
| 2003/0031329 | A1 * | 2/2003 | Shiobara | 381/98 |
| 2004/0170283 | A1 | 9/2004 | Terada et al. | |
| 2006/0159282 | A1 | 7/2006 | Borsch et al. | |
| 2007/0280487 | A1 | 12/2007 | Ura et al. | |

FOREIGN PATENT DOCUMENTS

| | | | |
|---|---|---|---|
| CN | 1511430 | A | 7/2004 |
| CN | 1809220 | A | 7/2006 |
| CN | 1934897 | A | 3/2007 |
| JP | 05-210391 | | 8/1993 |
| JP | 05-236588 | | 9/1993 |
| JP | 07-147700 | A | 6/1995 |
| JP | 08-193876 | | 7/1996 |
| JP | 10-145888 | A | 5/1998 |
| JP | 2003-032780 | A | 1/2003 |
| JP | 2003-274480 | A | 9/2003 |
| JP | 2004-032387 | | 1/2004 |
| JP | 2005-236713 | A | 9/2005 |
| JP | 2006-121188 | A | 5/2006 |
| JP | 2006-197407 | A | 7/2006 |
| JP | 2006-287849 | A | 10/2006 |
| JP | 2007-240704 | | 9/2007 |

* cited by examiner

*Primary Examiner* — Xu Mei
*Assistant Examiner* — Friedrich W Fahnert
(74) *Attorney, Agent, or Firm* — Wolf, Greenfield & Sacks, P.C.

(57) ABSTRACT

An acoustic-feedback detection apparatus includes: a first level detecting section configured to detect a signal level of sound signals obtained from a position in a sound-signal system in which a microphone and speaker are connected; a first extracting section configured to extract, from the sound signals of which the signal level is detected, signals in a band having a bandwidth predetermined for each of at least one predetermined center frequency; a second level detecting section configured to detect a signal level of the signals in each band, the signals being extracted by the first extracting section; and a determining section configured to determine whether or not acoustic feedback is occurring, on the basis of a threshold determined according to the signal level detected by the first level detecting section and a waveform of each signal level detected by the second level detecting section.

10 Claims, 12 Drawing Sheets

$$P = \frac{1}{1 + ADHM\beta} N + \frac{AHD}{1 + ADHM\beta} ES \quad \cdots (1)$$

$$\left| \frac{1}{1 + ADHM\beta} \right| \quad \cdots (2)$$

$$E = (1 + ADHM\beta) \quad \cdots (3)$$

$$P = \frac{1}{1 + ADHM\beta} N + ADHS \quad \cdots (4)$$

$$P = -F'ADHM\alpha N + FN + ADHS \quad \cdots (1)$$

$$F = F'ADHM\alpha \quad \cdots (2)$$

$$P = ADHS \quad \cdots (3)$$

APPARATUS AND METHOD FOR DETECTING ACOUSTIC FEEDBACK

BACKGROUND OF THE INVENTION

1. Field of the Invention

The present invention relates to an apparatus and a method for determining whether or not acoustic feedback is occurring in a sound-signal system in which a microphone and a speaker are connected.

2. Description of the Related Art

In a sound-signal system in which a microphone and a speaker are connected, part of an output from the speaker is fed back to the microphone, which may cause the so-called acoustic feedback (which is an oscillation phenomenon). The acoustic feedback often produces annoying middle/high frequency regular noise, such as squealing noise, and also may produce low-frequency regular noise, such as booming sound.

Acoustic feedback occurs not only in acoustic equipment (various public address systems) in which a microphone and a speaker are connected but also in headphone systems and hearing aids equipped with noise canceling systems.

Thus, various technologies for acoustic feedback have been developed. For example, Japanese Unexamined Patent Application Publication No. 08-193876 discloses an apparatus and a method that perform FFT (Fast Fourier Transform) processing on sound signals collected by a microphone, that determine a peak frequency point of power spectra, and that determine whether or not acoustic feedback is occurring.

Japanese Unexamined Patent Application Publication No. 2004-032387 discloses an apparatus that measures a time in which acoustic feedback is occurring and a time in which no acoustic feedback is occurring, that sets a gain upper limit of sound signals in accordance with the length of the measured time, and that controls the gain of the sound signals so as to prevent acoustic feedback.

SUMMARY OF THE INVENTION

The technology disclosed in Japanese Unexamined Patent Application Publication No. 08-193876 can determine at which frequency a sound signal is causing acoustic feedback. However, processing in the technology disclosed in Japanese Unexamined Patent Application Publication No. 08-193876 is somewhat complicated, since the FFT processing and the power-spectrum determination processing are performed.

The technology disclosed in Japanese Unexamined Patent Application Publication No. 2004-032387 can stably suppress acoustic feedback even if a situation in which acoustic feedback is likely to occur continues. However it is desired to more accurately prevent acoustic feedback. In particular, in a system in which music is played back, it is desired to prevent acoustic feedback without a deterioration of music sound to be played back.

Accordingly, it is desirable to allow whether or not acoustic feedback is occurring to be efficiently determined without complicated processing so that adequate measures can be taken.

In view of the foregoing situation, the present invention provides an acoustic-feedback detection apparatus. The acoustic-feedback detection apparatus includes: first level detecting means for detecting a signal level of sound signals obtained from a position in a sound-signal system in which a microphone and speaker are connected; extracting means for extracting, from the sound signals of which the signal level is detected, signals in a band having a bandwidth predetermined for each of at least one predetermined center frequency; second level detecting means for detecting a signal level of the signals in each band, the signals being extracted by the extracting means; and determining means for determining whether or not acoustic feedback is occurring, on the basis of a threshold determined according to the signal level detected by the first level detecting means and a waveform of each signal level detected by the second level detecting means.

In the acoustic-feedback detection apparatus, the first level detecting means detects a signal level of sound signals (all-band signals) including signals in all bands which can be processed by the sound-signal system in which the microphone and the speaker are connected. That is, the first level detecting means detects a signal level of sound signals (all-band signals) collected by the microphone, without band-limitation or the like.

The extracting means extracts, from the level-detected sound signals (all-band signals), signals in a band having a predetermined bandwidth for each predetermined center frequency. The signals extracted in each band in this case are signals in a band in which it is determined that the possibility of occurrence of acoustic feedback is high. The second level detecting means detects a signal level of the signals in each band which are extracted by the extracting means.

The determining means then sets a threshold for determining whether or not acoustic feedback is occurring, on the basis of the signal level of the all-band signals which is detected by the first level detecting means. Using the threshold and the signal level of the signals in each band which are detected by the second level detecting means, the determining means determines whether or not acoustic feedback is occurring, on the basis of the amplitude and periodicity of the signals.

Thus, without performing complicated computation processing, the acoustic-feedback detection apparatus can appropriately and efficiently detect whether or not acoustic feedback is occurring.

The acoustic-feedback detection apparatus may further include: third level detecting means for detecting a signal level of external sound signals to be supplied to a position in the sound-signal system; second extracting means for extracting, from the external sound signals, signals in a band having the bandwidth predetermined for each of the at least one center frequency; and fourth level detecting means for detecting a signal level of the signals in each band, the signals being extracted by the second extracting means. The determining means may determine whether or not acoustic feedback is occurring, on the basis of an output resulting from the detection preformed by the third level detecting means and an output resulting from the detection performed by the fourth level detecting means.

In the acoustic-feedback detection apparatus, the third level detecting means detects a signal level of the external sound signals supplied to the sound-signal system. The second extracting means extracts, from the external sound signals, signals in a band having a predetermined bandwidth for each predetermined center frequency. The signals extracted in each band in this case are signals in a band in which it is determined that the possibility of occurrence of acoustic feedback is high.

The fourth level detecting means detects a signal level of the signals in each band which are detected by the second extracting means. The determination means determines compares the output resulting from the detection performed by the third detecting means and the output resulting from the detection performed by the fourth detecting means, and determines whether or not acoustic feedback is occurring, considering whether or not the external input signals originally have a periodic component that can be mistaken as acoustic feedback.

In this case, in order to accurately determine whether or not acoustic feedback is occurring, the outputs resulting from the detection performed by the third and fourth level detecting means are also considered. This is because there are cases in which even when it is determined that acoustic feedback is occurring on the basis of the signal level of the all-band signals which is detected by the first level detecting means and the signal level of the signals in each band which are extracted from the all-band signals, the external sound signals that are externally supplied may in practice contain a periodic component. Thus, even when external sound signals such as music signals are externally supplied, it is possible to appropriately and efficiently determine whether or not acoustic feedback is occurring.

In the acoustic-feedback detection apparatus, a minimum value of the threshold may be predetermined so as to have a value that is greater than zero (0).

That is, the threshold used for determining whether or not acoustic feedback is occurring is set greater than zero.

With this arrangement, it is possible to prevent a case in which no sound signals exist or no acoustic feedback is occurring from being falsely detected as a case in which acoustic feedback is occurring. Thus, it is possible to appropriately and efficiently perform detection of acoustic feedback.

The acoustic-feedback detection apparatus may further include: adjusting means for adjusting, at a position in the sound-signal system, at least one of a gain and a phase of the sound signals; and controlling means for controlling the adjusting means on the basis of a result of the determination performed by the determining means.

That is, the sound-signal system may include adjusting means for adjusting at least one of a gain and a phase of the sound signals. The adjusting means is controlled by the controlling means in accordance with a result of the detection performed by the determining means.

With this arrangement, when acoustic feedback is occurring, the controlling means controls the adjusting means to adjust at least one of the gain and the phase of the sound signals to thereby undermine the sound oscillation conditions, thereby making it possible to prevent acoustic feedback. Thus, a determination can be efficiently performed as to whether or not acoustic feedback is occurring, and when acoustic feedback is occurring, it is possible to take appropriate measures.

The adjusting means may be capable of performing adjustment on the signals for each bandwidth predetermined for each of the at least one center frequency, and the controlling means controls the adjusting means so as to perform adjustment on the sound signals in a band in which acoustic feedback is occurring.

In the acoustic-feedback detection apparatus, the determining means can detect whether or not acoustic feedback is occurring for each band from which signals are extracted by the extracting means. Thus, the controlling means can perform gain and/or phase adjustment on only sound signals in a band in which acoustic feedback is occurring.

With this arrangement, a determination can be efficiently performed as to whether or not acoustic feedback is occurring, and when acoustic feedback is occurring, it is possible to take appropriate measures without performing excessive processing.

According to the present invention, a determination can be efficiently performed as to whether or not acoustic feedback is occurring without performing complicated processing, so that it is possible to take adequate measures.

DESCRIPTION OF THE PREFERRED EMBODIMENTS

An apparatus and a method according to an embodiment of the present invention will be described below with reference to the accompanying drawings. A description below is given of an example in which the present invention is applied to a noise canceling system used for a headphone.

First Embodiment

[Feedback-Type Noise Canceling System]

A feedback-type noise canceling system according to a first embodiment of the present invention will first be described.

Figures 1, 2:
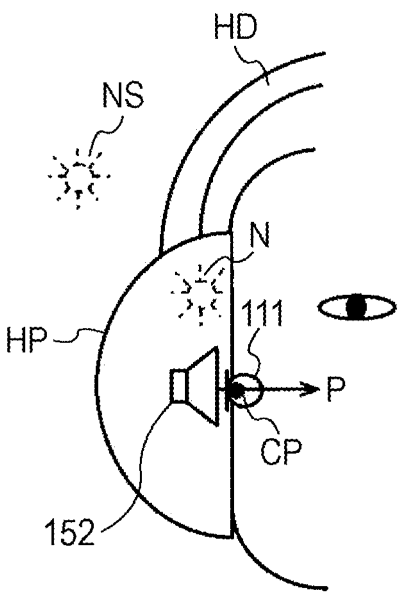
FIG. 1 illustrates an overview of a feedback-type noise canceling system.
FIG. 2 illustrates calculation expressions showing characteristics of the feedback-type noise canceling system.

FIG. 1 is a diagram showing the configuration of a right-channel-side of a headphone using a feedback-type noise canceling system when the headphone is placed on a user's head (the head of a user (listener)) HD.

Figure 3:
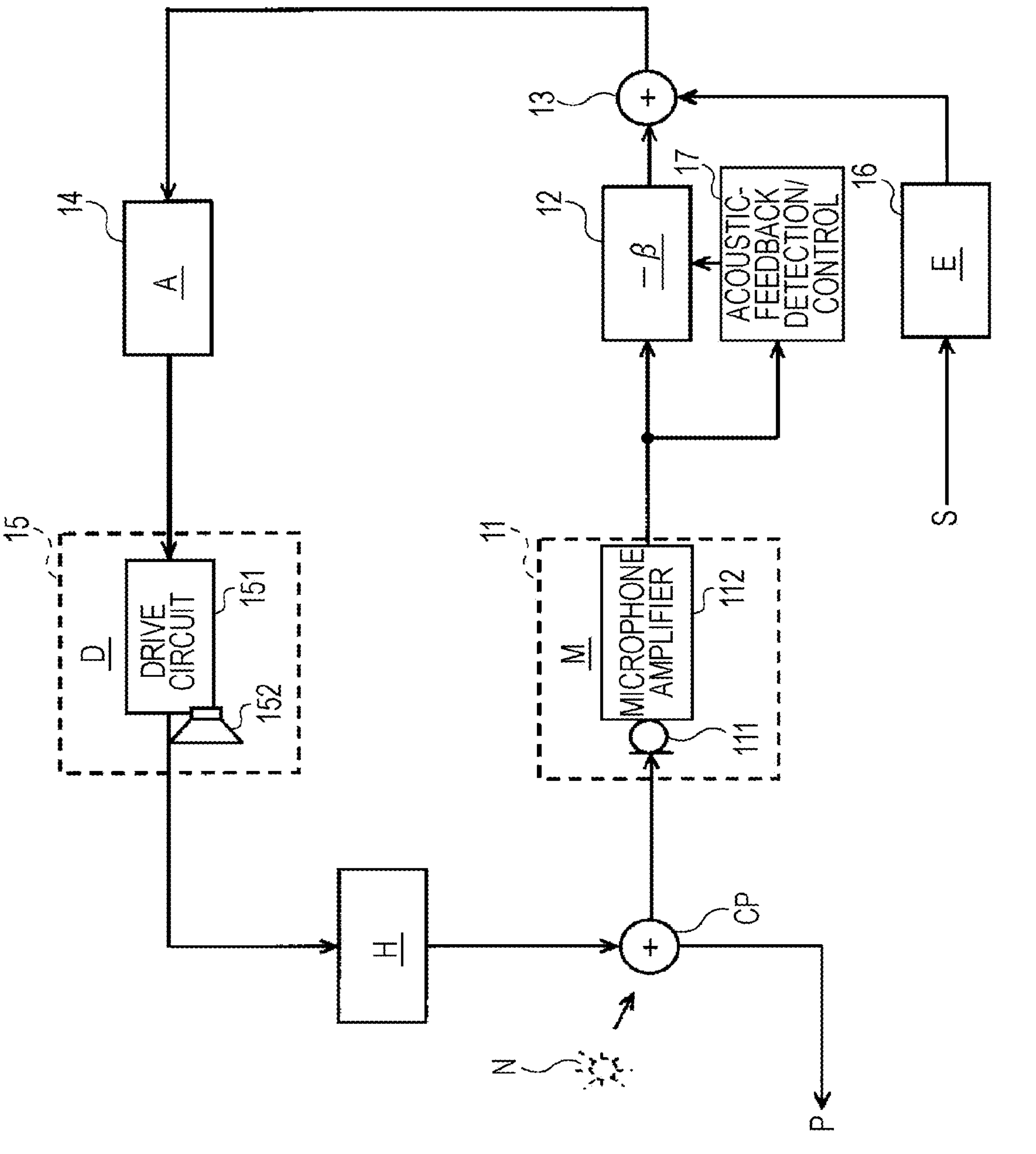
FIG. 3 is a diagram showing an overview of the configuration of the feedback-type noise canceling system.

FIG. 2 illustrates calculation expressions indicating characteristics of the feedback-type noise canceling system and FIG. 3 is a block diagram showing an overall configuration of the feedback-type noise canceling system.

The feedback system generally has a configuration in which a microphone 111 is disposed inside a headphone housing HP, as shown in FIG. 1.

Inverted-phase components (noise-reduced signals) of microphone input signals (noise signals) collected by the microphone 111 are fed back and subjected to servo control, so that noise externally introduced into the headphone housing HP is attenuated.

In this case, the position of the microphone 111 becomes a cancel point (control point) CP which corresponds to the ear position of the listener. Thus, considering a noise attenuation effect, the microphone 111 is often placed at a position adjacent to the listener's ear, that is, on a front side of a diaphragm of a speaker 152.

In FIG. 1, character N indicates noise that enters the vicinity of the microphone 111 in the headphone housing HP from an external noise source NS and character P indicates a sound pressure (output sound) that reaches the listener's ear.

As described above, in the feedback-type noise canceling system used for the headphone, both of the microphone 111 for noise collection and the speaker 152 are disposed in the headphone housing HP.

As described above, for the feedback-type noise canceling system shown in FIG. 1, the microphone 111 is often disposed on the front side of the diaphragm of the speaker 152. Thus, it can be said that that possibility of occurrence of acoustic feedback is relatively high.

The feedback-type noise canceling system according to the embodiment of the present invention will now be described in detail with reference to the calculation expressions shown in FIG. 2 and the block diagram shown in FIG. 3.

The feedback-type noise canceling system shown in FIG. 3 includes a microphone and microphone-amplifier section 11 having the microphone 111 and a microphone amplifier 112. The noise canceling system further includes a filter circuit (hereinafter referred to as an "FB filter circuit") 12 designed for feedback control, a combining section 13, a power amplifier 14, a driver 15, and an equalizer 16. The driver 15 has a drive circuit 151 and the speaker 152.

The feedback-type noise canceling system shown in FIG. 3 further includes an acoustic-feedback detection/control section 17. The acoustic-feedback detection/control section 17 detects whether or not acoustic feedback is occurring, on the basis of sound signals output from the microphone amplifier 112. When acoustic feedback is occurring, the acoustic-feedback detection/control section 17 controls an FB filter circuit 12 so as to prevent acoustic feedback. Details of the acoustic-feedback detection/control section 17 are described below.

In FIG. 3, characters A, D, M, and $-\beta$ shown in the blocks represent transfer functions of the power amplifier 14, the driver 15, the microphone and microphone-amplifier section 11, and the FB filter circuit 12, respectively.

Similarly, in FIG. 3, character E in the block of the equalizer 16 represents a transfer function of the equalizer 16, the transfer function being multiplied to an external input signals S (such as music signals) of music to be listened to. Character H in a block placed between the driver 15 and the cancel point CP represents a transfer function for the space from the driver 15 to the microphone 111 (a transfer function between the driver 15 and the cancel point CP). The transfer functions are represented in complex representations.

In FIG. 3, character N represents noise that enters from the external noise source NS to the vicinity of the microphone 111 in the headphone housing HP and character P represents a sound pressure (output sound) that reaches the listener's ear, as in the case shown in FIG. 1.

The cause of the transmission of the noise N into the headphone housing HP is, for example, a sound pressure leaking from a gap in an ear pad portion of the headphone housing HP or sound propagating to the inside of the housing HP as a result of headphone housing HP vibration due to the sound pressure.

In this case, in the noise canceling system shown in FIG. 3, the sound pressure P that reaches the listener's ear can be represented as in expression (1) shown in FIG. 2. In expression (1) shown in FIG. 2, when attention is paid to the noise N, it can be understood that the noise N is attenuated to $1/(1+ADHM\beta)$. However, in order for the system represented by expression (1) shown in FIG. 2 to operate stably as a noise canceling mechanism in a band in which noise is to be reduced without oscillation, it is generally necessary that expression (2) shown in FIG. 2 be satisfied.

In this feedback system, while satisfying expression (2) in FIG. 2, a designer designs a filter considering human acoustic characteristics. In many cases, evaluation for the filter design considering the human acoustic characteristics is performed by the designer himself/herself. Many feedback-type noise canceling headphones have been developed and sold, and can be said to be widely available on the market.

Next, a description will be given of a case in which the headphone reproduces sound in the feedback-type noise canceling system (shown in FIG. 3) with the above-described noise reduction function.

Externally input sound S shown in FIG. 3 is a collective term of sound signals that are supposed to be reproduced by the driver for the headphone, for example, music signals from a music playback apparatus, sound signals collected by the microphone outside the housing (e.g., when the system is used as a hearing-aid function) and sound signals via communication, such as phone communication (e.g., when the system is used as a headphone).

When attention is paid to the input sound S in expression (1) in FIG. 2, the transfer function E of the equalizer 16 can be represented as in expression (3) in FIG. 2. When attention is also paid to the transfer function E of the equalizer 16 in expression (3) in FIG. 2, output sound P of the noise canceling system shown in FIG. 3 can be represented as expression (4) shown in FIG. 2.

As described above, character H represents the transfer function from the driver 15 to the microphone 111 (ear) and characters A and D represent the transfer functions of the power amplifier 14 and the driver 15, respectively. Thus, it can be understood, when the position of the microphone 111 is very close to the position of the ear, a characteristic that is similar to that of a typical headphone having no noise-reduction function is obtained. The transfer characteristic E of the equalizer 16 in this case is substantially equal to an open loop characteristic viewed along a frequency axis.

As described above, in the feedback-type noise canceling system, the FB filter circuit 12 generates a noise canceling signal from sound signals (noise signals) collected by the microphone 111 disposed in the headphone housing HP. The noise canceling signal is combined with the input sound S supplied via the equalizer 16, so that noise in the headphone housing HP is canceled.

As described above, in the feedback-type noise canceling system shown in FIGS. 1 and 3, the microphone 111 and the speaker 152 are disposed in the headphone housing HP. Thus, in the feedback-type noise canceling system, acoustic feedback can occur. Accordingly, the feedback-type noise canceling system according to the first embodiment includes the acoustic-feedback detection/control section 17, as shown in FIG. 3.

As described above, acoustic-feedback detection/control section 17 determines whether or not acoustic feedback is occurring, on the basis of the noise signal collected by the microphone 111 and amplified by the microphone amplifier 112. When acoustic feedback is occurring, the acoustic-feedback detection/control section 17 controls the FB filter circuit 12 to adjust the gain and/or the phase of the sound signals (noise signals) output from the microphone amplifier 112, so as to suppress occurrence of acoustic feedback.

[Configuration Example and Operation of Acoustic-Feedback Detection/Control Section 17]

Figure 4:
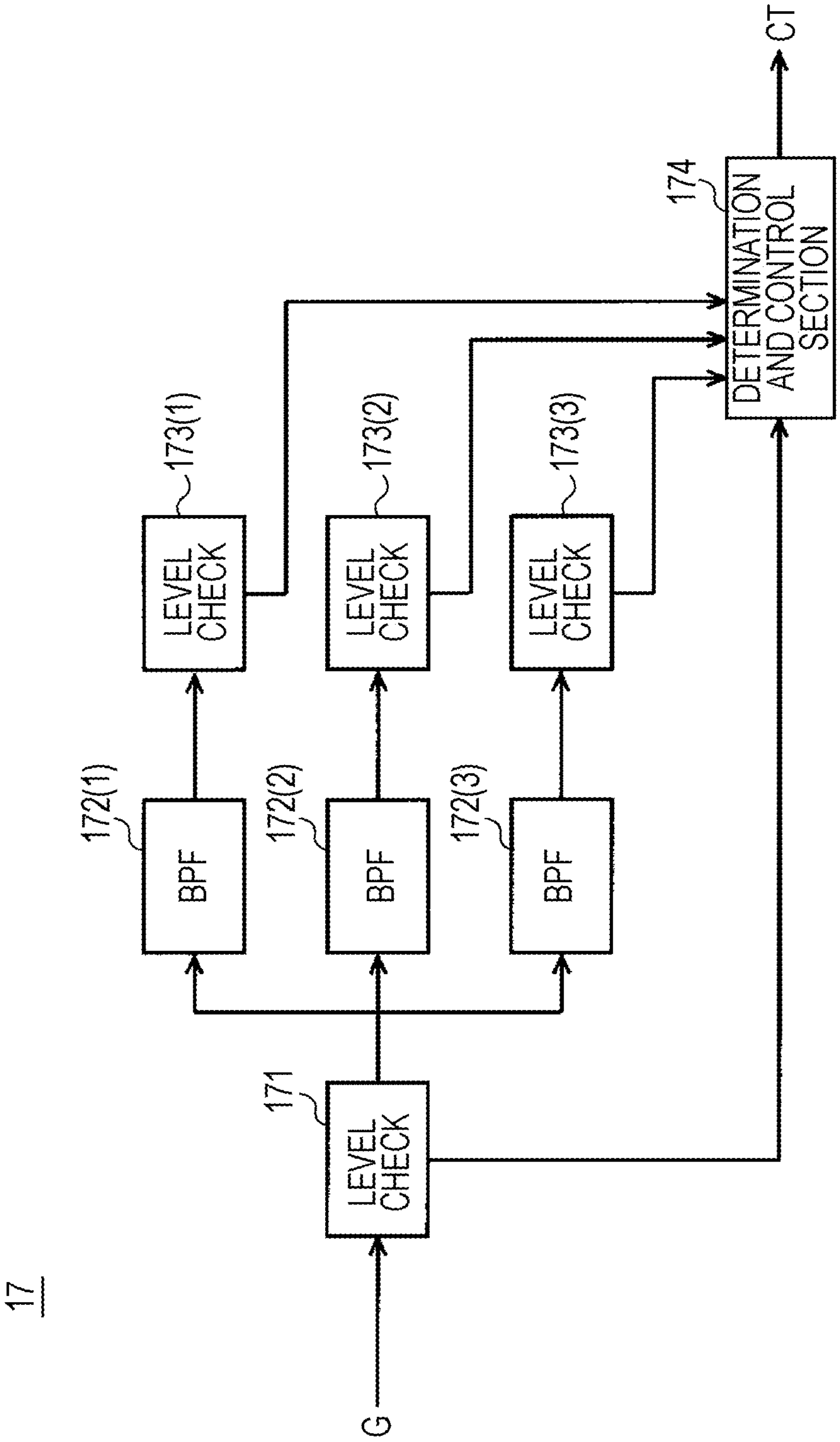
FIG. 4 is a block diagram illustrating an example of the configuration of an acoustic-feedback detection/control section.

A description is now given of a configuration example and the operation of the acoustic-feedback detection/control section 17 provided in the feedback-type noise canceling system shown in FIG. 3. FIG. 4 is a block diagram illustrating a configuration example of the acoustic-feedback detection/control section 17 provided in the feedback-type noise canceling system shown in FIG. 3.

As shown in FIG. 4, the acoustic-feedback detection/control section 17 includes a level check section 171, band pass filters (BPFs) 172(1), 172(2), and 172(3), level check sections 173(1), 173(2), and 173(3), and a determination and control section 174.

The level check section 171 detects a signal level of microphone input signals G supplied thereto, sends the detected signal level to the determination and control section 174, and directly supplies the microphone input signals G to the subsequent BPFs 172(1), 172(2), and 172(3).

The microphone input signals G supplied to the level check section 171 are noise signals collected by the microphone 111 and amplified by the microphone amplifier 112. That is, the microphone input signals (noise signals) G supplied to the level check section 171 are all-band signals including sound signals in all bands which are collectable by the microphone 111 without no band restriction or the like.

Thus, microphone input signals including all-band sound signals collected by the microphone 111 are hereinafter referred to as "all-band signals G".

Each of the BPFs 172(1), 172(2), and 172(3) extracts, from the all-band signals G supplied from the level check section 171, sound signals (noise signals) with a predetermined bandwidth at a predetermined center frequency.

The BPF 172(1) extracts sound signals in a band having, for example, a bandwidth of several hertz at a center frequency of 13 Hz. The BPF 172(2) extracts sound signals in a band having, for example, a bandwidth of several tens of hertz at a center frequency of 1300 Hz. The BPF 172(3) extracts sound signals in a band having, for example, a bandwidth of several tens of hertz at a center frequency of 5000 Hz. In this manner, the BPFs 172(1), 172(2), and 172(3) extract sound signals with bandwidths that are different from each other.

The center frequencies and the bandwidths used by the BPFs 172(1), 172(2), and 172(3) are predetermined. Specifically, an intended noise canceling system is configured and is subjected to experiment, so that frequency bands in which acoustic feedback is likely to occur in the noise canceling system in terms of audio mechanism are picked up. Based on the result of the frequency-band pickup, the center frequencies and the bandwidths are set for the BPFs 172(1), 172(2), and 172(3).

Thus, in an intended sound-signal system (audio system) adapted so that a microphone and a speaker are connected, targets are narrowed down to frequency bands in which acoustic feedback is likely to occur and BPFs (band pass filters) for detecting (extracting) acoustic-feedback frequencies are used to filter the all-band signals G (which are microphone input signals).

The sound signals (noise signals) in the predetermined frequency bands, the sound signals being extracted by the BPFs 172(1), 172(2), and 172(3), are supplied to the corresponding level check sections 173(1), 173(2), and 173(3).

In response to the band-limited sound signals (noise signals) supplied from the BPF 172(1), the level check section 173(1) detects a signal level of the sound signals, and supplies the detected signal level to the determination and control section 174.

Similarly, in response to the band-limited sound signals (noise signals) supplied from the BPF 172(2), the level check section 173(2) detects a signal level of the sound signals, and supplies the detected signal level to the determination and control section 174.

Similarly, in response to the band-limited sound signals (noise signals) supplied from the BPF 172(3), the level check section 173(3) detects a signal level of the sound signals, and supplies the detected signal level to the determination and control section 174.

Thus, the signal level of the all-band signals supplied from the level check section 171 and the signal levels of the sound signals in the bands in which acoustic feedback is likely to occur, the latter signal levels being supplied from the level check sections 173(1), 173(2), and 173(3), are supplied to the determination and control section 174.

When acoustic feedback is occurring, the sound volume of the acoustic feedback accounts for a large ratio of the all-band signals G. Thus, when acoustic feedback is occurring, the amplitude of filtered signals in a band in which the acoustic feedback is occurring also becomes large so as to correspond to the amplitude of the all-band signals.

In contrast, when no acoustic feedback is occurring, the amplitude of filtered signals corresponds to their original signals in the band and thus is considerably smaller than the amplitude of the all-band signals.

On the basis of the signal level of the all-band signals which is supplied from the level check section 171, the determination and control section 174 determines an all-band maximum value Max, which is a maximum value of all band signals G. Next, in accordance with the determined all-band maximum value Max, the determination and control section 174 sets a threshold Th that serves as a reference for determining whether or not acoustic feedback is occurring.

More specifically, the threshold Th is determined in accordance with the all-band maximum value Max so that signals in a band in which acoustic feedback is likely to occur have values that are slightly larger than an amplitude that is obtained in a normal state in which no acoustic feedback is occurring. For example, the threshold Th is determined to have a value that is several tens of percentages of the all-band maximum value Max or a value that is several decibels lower than the all-band maximum value Max.

The all-band maximum value Max and the threshold Th are adjusted so that the minimum values thereof are larger than zeros (0s). Even if the all-band signals have a value of 0 or smaller, at least the threshold Th is set to be larger than 0. This is aimed to prevent false detection in which when the threshold Th is small, a noise signal that does not cause acoustic feedback is detected as a signal that causes acoustic feedback, as described below.

The determination and control section 174 determines whether or not acoustic feedback is occurring, on the basis of the set threshold Th and the signal levels of the in-band noise signals extracted and supplied from the level check sections 173(1), 173(2), and 173(3).

Upon determining that acoustic feedback is occurring, the determination and control section 174 uses a control signal CT to control the FB filter circuit 12 so as to perform processing on the sound signals (noise signals), thereby undermining the oscillation conditions to prevent acoustic feedback. More specifically, processing is performed so as to undermine the oscillation conditions by reducing the gain of the sound signals (noise signals) to be processed, shifting the phase of the noise signals, or performing both of the operations.

In the case of the first embodiment, as described above with reference to FIG. 4, noise signals in three bands in which acoustic feedback is likely to occur, specifically, in a band with a center frequency of 13 Hz, a band with a center frequency of 1300 Hz, and a band with a center frequency of 5000 Hz, are extracted.

Thus, when acoustic feedback is occurring, it is possible to identify in which band the acoustic feedback is occurring. Thus, gain and/or phase adjustment may be performed on noise signals in the identified band.

Next, a description will be given of a specific method for determining whether or not acoustic feedback is occurring. Acoustic feedback occurs due to occurrence of oscillation in a sound-signal system when the sound-signal system forms a feedback loop, such as when sound collected by a microphone and then output from a speaker is collected by the microphone.

Since acoustic feedback occurs due to such an oscillation phenomenon in the sound-signal system, a sound signal (an acoustic-feedback signal) observed when acoustic feedback is occurring varies periodically, like a sine wave.

Accordingly, when the waveforms of the signal levels of the level check section 173(1), 173(2), or 173(3) have periodic waveforms that are similar to that of a sine wave and that have amplitude exceeding the set threshold Th, the determination and control section 174 determines that acoustic feedback is occurring.

Figure 5:
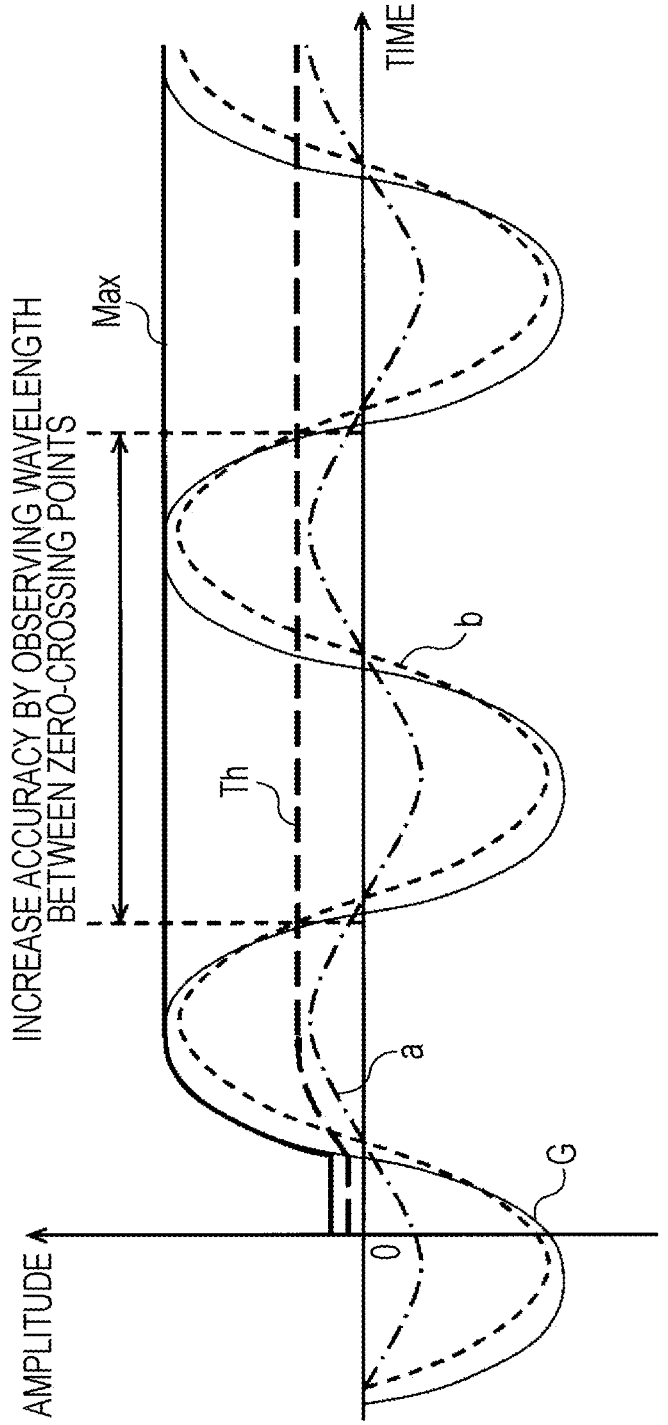
FIG. 5 is a diagram illustrating a method for determining whether or not acoustic feedback is occurring.

FIG. 5 illustrates a method for determining whether or not acoustic feedback is occurring. In FIG. 5, the horizontal axis indicates time and the vertical axis indicates signal amplitude. The all band signals (microphone input signals) collected via the microphone generally have complicated waveforms. The acoustic-feedback signals, however, are periodic, and thus, for ease of illustration and for simplification of description, the all-band signals G collected by the microphone 111 are also shown in FIG. 5 as having a periodic waveform.

A waveform shown by a narrow solid line in FIG. 5 represents the all-band signals (source microphone input signals) G collected by the microphone 111. A waveform shown by a thick line in FIG. 5 represents the waveform of the all-band maximum value Max of the all-band signals G.

The waveform of the all-band maximum value Max can be simply determined by connecting peak points of the all-band signals G. The waveform of the all-band maximum value Max can also be determined by an appropriate method, such as using a largest peak value of the all-band signals G as the maximum value Max or using the average of the peak values of the all-band signals G as the maximum value Max.

As shown in FIG. 5, the threshold Th, which is used to determine whether or not acoustic feedback is occurring, is set based on the all-band maximum value Max. As described above, the threshold Th is set based on the all-band maximum value Max so as to have, for example, a value that is several tens of percentages of the all-band maximum value Max.

For example, when the amplitude of the microphone input signals (noise signals) filtered and extracted by the BPF 172 (1) is smaller than or equal to the threshold Th, as shown by a waveform a indicated by a dashed-dotted line in FIG. 5, it is determined that no acoustic feedback is occurring in the band.

In contrast, when the amplitude of the microphone input signals (noise signals) filtered and extracted by the BPF 172 (1) is greater than the threshold Th, as shown by a waveform b indicated by a dotted line in FIG. 5, it is determined that acoustic feedback is occurring in the band.

With respect to the in-band noise signals extracted by the BPF 172(2) and BPF 172(3), a determination is also made as to whether or not acoustic feedback is occurring in the correspond bands, as in the case of the noise signals extracted by the BPF 172(1).

As described above and shown in FIG. 5, even when the all-band signals G have a value of 0 or smaller, the minimum value of the all-band maximum value Max and the minimum value of the threshold Th are set so as to be larger than 0s. This is aimed to prevent false detection of acoustic feedback.

In FIG. 5, observation of a wavelength between zero-crossing points when the waveform changes in an amplitude-decreasing direction also makes it possible to determine whether or not the filtered microphone input signals (noise signals) change periodically. Needless to say, the arrangement may also be such that a determination is made as to whether or not the filtered microphone input signals (noise signals) are periodic on the basis of the period of appearance of the peak points.

In this manner, the threshold Th is set based on the maximum value Max of the microphone input signals (all-band signals) from the microphone 111. When the waveform of the signal level of signals in a target frequency band is a sinusoidal, periodic waveform having an amplitude that exceeds the threshold Th, it can be determined that acoustic feedback is occurring.

The acoustic-feedback detection/control section 17 having the configuration shown in FIG. 4 can be implemented by a DSP (digital signal processor), a CPU (central processing unit), or the like. In such a case, the functions of the level check section 171, the BPFs 172(1), 172(2), and 172(3), the level check sections 173(1), 173(2), and 173(3), and the determination and control section 174, which are shown in FIG. 4, are realized by a program.

The BPFs 172(1), 172(2), and 172(3) are implemented by, for example, weak infinite-impulse-response (IIR) filters. This arrangement make it possible to realize the acoustic-feedback detection and the control algorithms, described with reference to FIGS. 4 and 5, without a large amount of load on the DSP or CPU.

[Specific Example of Operation of Acoustic-Feedback Detection/Control Section 17]

A specific example of the operation of the acoustic-feedback detection/control section 17 provided in the noise canceling system (described above with reference to FIGS. 4 and 5) according to first embodiment will be described next with reference to a flow chart shown in FIG. 6.

Figure 6:
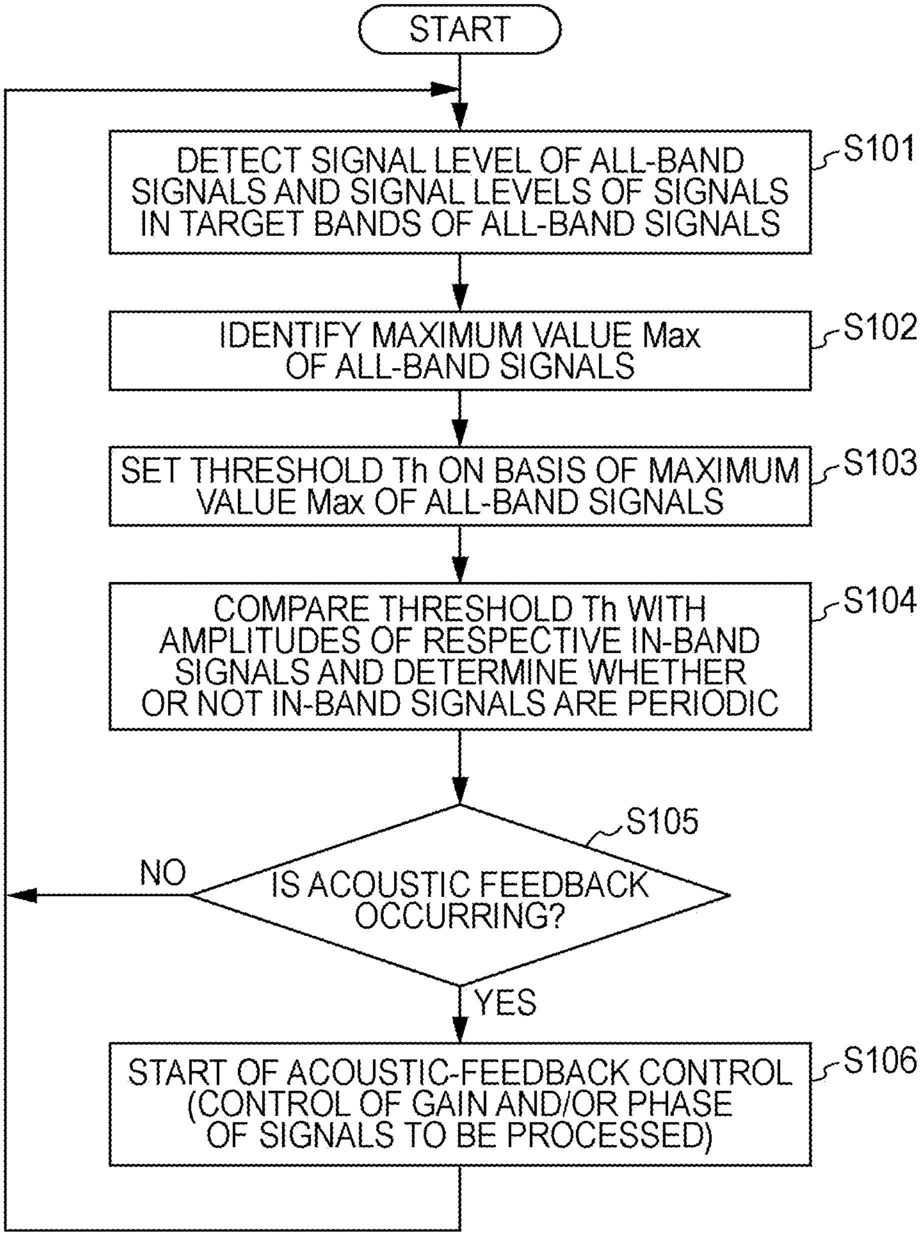
FIG. 6 is a flowchart illustrating a specific example of the operation of the acoustic-feedback detection/control section.

FIG. 6 is a flowchart illustrating a specific example of the operation of the acoustic-feedback detection/control section 17 according to the first embodiment. The processing shown in FIG. 6 is executed, for example, when the noise canceling system according to the first embodiment is powered on.

In step S101, the acoustic-feedback detection/control section 17 detects a signal level of all-band signals G and signal levels of filtered signals in the target frequency bands and supplies the detection results to the determination and control section 174. To realize the processing in step S101, the level check section 171, the BPFs 172(1), 172(2), and 172(3), and the level check sections 173(1), 173(2), and 173(3) function in cooperation with each other.

In step S102, the determination and control section 174 identifies a maximum value Max of the all-band signals, on the basis of the waveform of the supplied signal level of the all-band signals G. Next, in step S103, on the basis of the maximum value Max identified in step S102, the determination and control section 174 sets a threshold Th used for determining whether or not acoustic feedback is occurring.

In step S104, the determination and control section 174 compares the threshold Th set in step S103 with the amplitudes of the respective in-band signals supplied from the level check sections 173(1), 173(2), and 173(3) and also determines whether or not the in-band signals are periodic.

In step S105, on the basis of the comparison and determination performed in step S104, the determination and control section 174 determines whether or not acoustic feedback is occurring.

More specifically, in step S105, when even any one of the in-band signals extracted by the BPFs has an amplitude that is larger than the threshold Th and changes periodically, the determination and control section 174 determines that acoustic feedback is occurring. Conversely, when none of the in-band signals extracted by the BPFs has an amplitude that is larger than the threshold Th, the determination and control section 174 determines that no acoustic feedback is occurring.

When the determination and control section 174 determines that no acoustic feedback is occurring in the determination processing in step S105, the processing in step S101 and the steps subsequent thereto is repeated.

When the determination and control section 174 determines that acoustic feedback is occurring in the determination processing in step S105, the process proceeds to step S106 in which the determination and control section 174 starts control processing for preventing acoustic feedback.

More specifically, in step S106, the determination and control section 174 performs processing for generating a control signal CT for causing the FB filter circuit 12 to adjust the gain and/or the phase of signals and for supplying the control signal CT to the FB filter circuit 12. Thereafter, the acoustic-feedback detection/control section 17 repeats the processing in step S101.

As described above, the noise canceling system according to the first embodiment analyzes the all-band signals G, which are microphone input signals collected by the microphone 111, to thereby make it possible to accurately and efficiently determine whether or not acoustic feedback is occurring.

Upon detecting that acoustic feedback is occurring, the noise canceling system can also undermine the oscillation conditions by controlling the gain and/or the phase of the microphone input signals, thereby preventing acoustic feedback.

When acoustic feedback is occurring, the noise canceling system according to the first embodiment controls the FB filter circuit 12 to adjust the gain and/or the phase of the microphone input signals so as to undermine the oscillation conditions, thereby preventing acoustic feedback. The present invention, however, is not limited to this arrangement.

The arrangement may also be such that, for example, a gain control circuit and/or a phase control circuit, such as a delay circuit, for sound signals is provided at a portion between the microphone and microphone-amplifier section 11 and the driver 15 and is controlled. Needless to say, only one of the gain control circuit and the phase control circuit or both of the circuits may be provided.

Although the acoustic-feedback detection/control section 17 in the noise canceling system according to the first embodiment described above is adapted to extract signals in three different frequency bands, the present invention is not limited thereto.

Depending on the audio system, the number of frequency bands in which acoustic feedback can occur may be 4, 5, or the like, which is greater than 3. In such a case, according to the number of frequency bands to be extracted, the number of BPFs and the number of level check sections that receive signals supplied from the BPFs may be increased.

When the number of frequency bands in which acoustic feedback can occur is limited to 1 or 2, the number of BPFs and the number of level check sections that receive signals supplied from the BPF(s) can also be reduced to configure the acoustic-feedback detection/control section 17.

Second Embodiment

In the noise canceling system according to the first embodiment described above, only the microphone input signals are analyzed to make it possible to determine whether or not acoustic feedback is occurring. However, there may be cases in which the externally supplied input signals (external input signals) S themselves may also be sound signals that change periodically similarly to acoustic-feedback signals.

For example, sound signals of a whistle have a tendency to change periodically, like acoustic-feedback signals. In addition some sound signals generated and output by various electronic music instruments also have a tendency to change periodically similarly to acoustic-feedback signals.

Thus, in the noise canceling system according to the first embodiment described above, there are cases in which occurrence of acoustic feedback is falsely detected when no acoustic feedback is actually occurring, depending on a characteristic of the external input signals S.

Accordingly, in this second embodiment of the present embodiment, the characteristic of the external input sound signals S is also considered to improve the detection accuracy of acoustic feedback.

Figure 7:
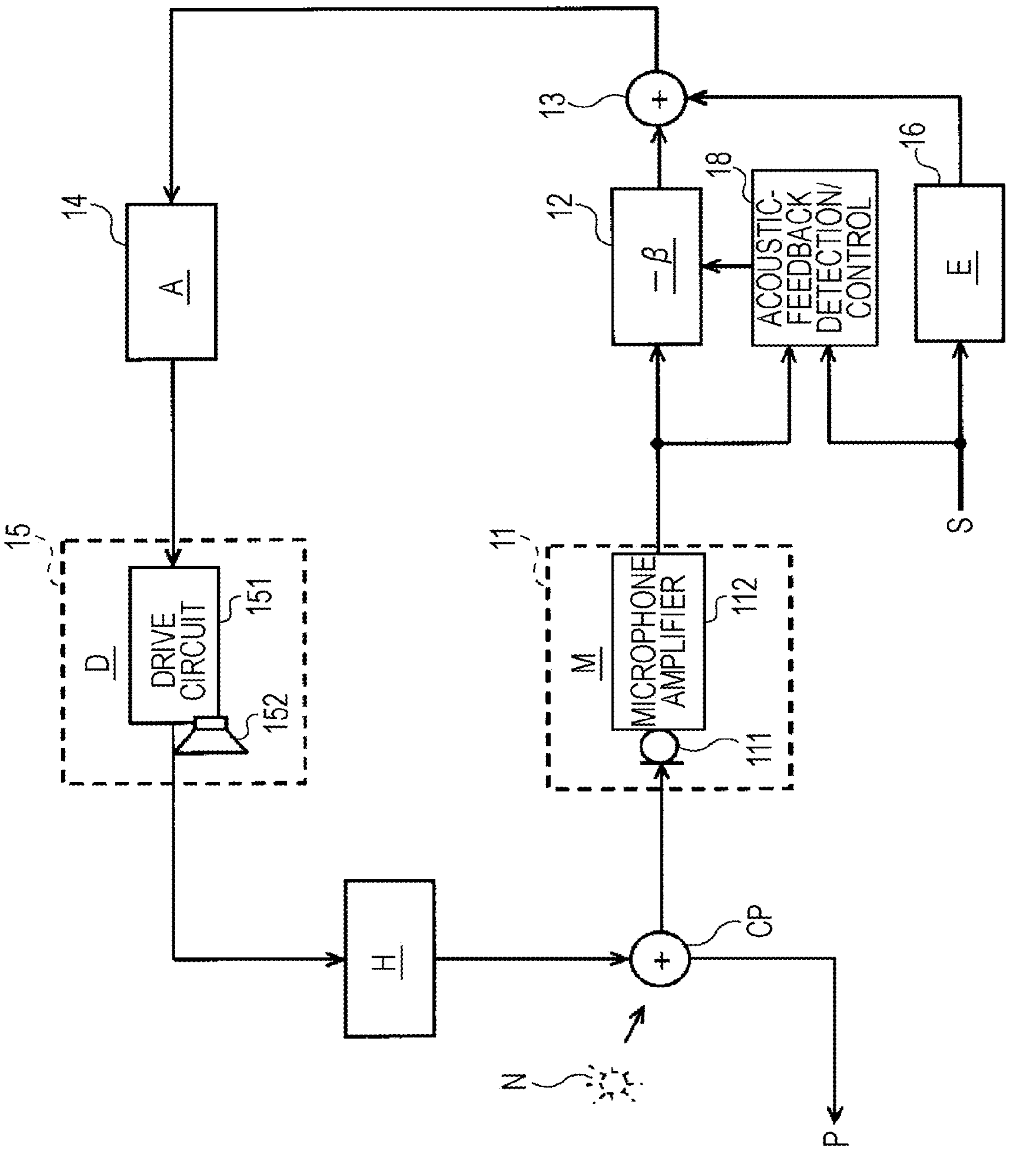
FIG. 7 is a block diagram illustrating a noise canceling system according to a second embodiment of the present invention.

FIG. 7 is a block diagram illustrating a noise canceling system according to the second embodiment of the present invention. The noise canceling system according to the second embodiment is also a feedback-type noise canceling system, as in the case of the first embodiment.

In the noise canceling system according to the second embodiment shown in FIG. 7, sections configured in the same manner as those in the noise canceling system according to the first embodiment shown in FIG. 3 are denoted by the same reference characters, and descriptions thereof are not given.

The noise canceling system according to the second embodiment also has an acoustic-feedback detection/control section 18, which is different from the acoustic-feedback detection/control section 17 used in the noise canceling system according to the first embodiment.

The acoustic-feedback detection/control section 18 in the second embodiment has a function that is similar to the acoustic-feedback detection/control section 17 in the first embodiment. That is, the acoustic-feedback detection/control section 18 has a function for detecting whether or not acoustic feedback is occurring. The acoustic-feedback detection/control section 18 further has a function for controlling, when acoustic feedback is occurring, an FB filter circuit 12 so as to stop the acoustic feedback.

According to the second embodiment, as shown in FIG. 7, microphone input signals (all-band signals) G supplied from a microphone amplifier 112 and also input signals (external input signals) S supplied from an equalizer 16 are input to the acoustic-feedback detection/control section 18.

The acoustic-feedback detection/control section 18 in the second embodiment first analyzes the all-band signals G supplied from the microphone amplifier 112, to thereby determine whether or not there is a possibility that acoustic feedback is occurring.

In addition, the acoustic-feedback detection/control section 18 according to the second embodiment analyzes the external input signals S to determine whether or not the external input signals S are originally periodic, and also based on the result of the determination, the acoustic-feedback detection/control section 18 determines whether or not acoustic feedback is occurring.

[Configuration Example and Operation of Acoustic-Feedback Detection/Control Section 18]

Figure 8:
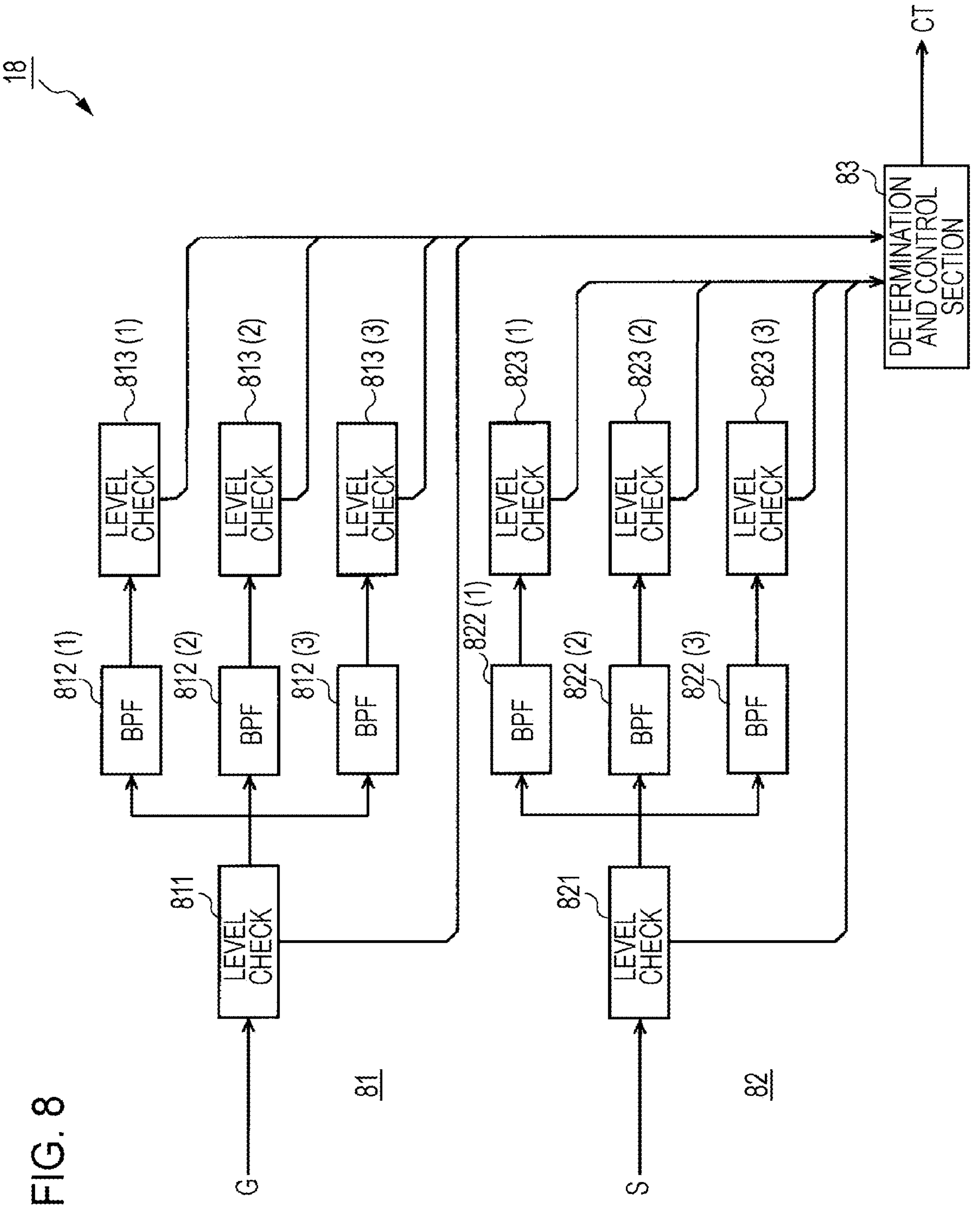
FIG. 8 is a block diagram illustrating an example of the configuration of an acoustic-feedback detection/control section.

A description is now given of a configuration example and the operation of the acoustic-feedback detection/control section 18 provided in the feedback-type noise canceling system shown in FIG. 7. FIG. 8 is a block diagram illustrating a configuration example of the acoustic-feedback detection/control section 18 provided in the feedback-type noise canceling system shown in FIG. 7.

As shown in FIG. 8, the acoustic-feedback detection/control section 18 in the second embodiment generally has a first processor 81 for the all-band signals G and a second processor 82 for the external input signals S.

As shown in FIG. 8, the first processor 81 for the all-band signals G includes a level check section 811, BPFs 812(1), 812(2), and 812(3), and level check sections 813(1), 813(2), and 813(3). These sections achieve similar functions of the corresponding sections in the acoustic-feedback detection/control section 17 in the first embodiment described above with reference to FIG. 4.

Thus, the level check section 811 detects a signal level of the microphone input signals G supplied thereto, sends the detected signal levels to a determination and control section 83, and directly supplies the microphone input signals G to the subsequent BPFs 812(1), 812(2), and 812(3).

The microphone input signals (all-band signals) G supplied to the level check section 811 are noise signals collected by the microphone 111 and amplified by the microphone amplifier 112, and include sound signals in all bands which are collectable by the microphone 111.

Each of the BPFs 812(1), 812(2), and 812(3) extracts, from the all-band signals G supplied from the level check section 811, sound signals (noise signals) with a predetermined bandwidth at a predetermined center frequency.

In the second embodiment, the BPF 812(1) extracts sound signals in a band having, for example, a bandwidth of several hertz at a center frequency of 13 Hz. The BPF 812(2) extracts sound signals in a band having, for example, a bandwidth of several tens of hertz at a center frequency of 1300 Hz. The BPF 812(3) extracts sound signals in a band having, for example, a bandwidth of several tens of hertz at a center frequency of 5000 Hz. In this manner, the BPFs 812(1), 812(2), and 812(3) extract sound signals having bandwidths that are different from each other.

In the second embodiment, the center frequencies and the bandwidths used for the BPFs 812(1), 812(2), and 812(3) are predetermined as in the case of the first embodiment.

That is, an intended noise canceling system is configured and is subjected to experiment, so that frequency bands in which acoustic feedback is likely to occur in the noise canceling system in terms of audio mechanism are picked up. Based on the result of the frequency-band pickup, the center frequencies and the bandwidths are set for the BPFs 812(1), 812(2), and 812(3).

Thus, in an intended audio signal system (audio system) adapted so that a microphone and a speaker are connected, targets are narrowed down to frequency bands in which acoustic feedback is likely to occur and BPFs (band pass filters) for detecting (extracting) acoustic-feedback frequencies are used to filter the all-band signals G (which are microphone input signals).

The sound signals (noise signals) in the predetermined frequency bands, the sound signals being extracted by the BPFs 812(1), 812(2), and 812(3), are supplied to the corresponding level check sections 813(1), 813(2), and 813(3).

Upon receiving the band-limited sound signals (noise signals) from the corresponding BPFs 812(1), 812(2), 813(3), the level check sections 813(1), 813(2), and 813(3) detect signal levels of the sound signals. The level check sections 813(1), 813(2), and 813(3) supply the detected signal levels to the determination and control section 83.

Thus, the signal level of the all-band signals G which is supplied from the level check section 811 and the signal levels of the sound signals in the predetermined bands (in which acoustic feedback is likely to occur) of the all-band signals G, the latter signal levels being supplied from the level check sections 813(1), 813(2), and 813(3), are supplied to the determination and control section 83.

On the other hand, the second processor 82 for the external input signals S performs processing, which is similar to that performed by the first processor 81 for the all-band signals G, on the external input signals S.

As shown in FIG. 8, the first processor 82 for the external input signals S includes a level check section 821, BPFs 822(1), 822(2), and 822(3), and level check sections 823(1), 823(2), and 823(3).

The level check section 821 detects a signal level of the external input signals S, sends the detected signal level to the determination and control section 83, and directly supplies the external input signals S to the subsequent BPFs 822(1), 822(2), and 822(3).

The external input signals S supplied to the level check section 821 are sound signals that are externally supplied to the noise canceling system in the first embodiment and that are to be reproduced by the driver 15 of the headphone.

More specifically, as described above, the external input signals S may be music signals output from a music playback apparatus, sound signals collected by a microphone disposed outside the housing (e.g., when the system is used as a hearing aid function), or sound signals via communication, such as phone communication (e.g., when the system is used as a headset).

Each of the BPFs 822(1), 822(2), and 822(3) extracts, from the external input signals S supplied from the level check section 821, sound signals (noise signals) with a predetermined bandwidth at a predetermined center frequency.

The center frequencies and the bandwidths corresponding to the frequency bands that are picked up as bands in which acoustic feedback is likely to occur in the noise canceling system in the present embodiment are also set for the BPFs 822(1), 822(2), and 822(3).

Thus, in the second embodiment, the BPF 822(1) also extracts sound signals in a band having, for example, a bandwidth of several hertz at a center frequency of 13 Hz. The BPF 822(2) extracts sound signals in a band having, for example, a bandwidth of several tens of hertz at a center frequency of 1300 Hz. The BPF 822(3) extracts sound signals in a band having, for example, a bandwidth of several tens of hertz at a center frequency of 5000 Hz.

As described in the case of the second embodiment, in an audio system adapted so that a microphone and a speaker are connected, targets are narrowed down to frequency bands in which acoustic feedback is likely to occur. Further, the BPFs for detecting (extracting) acoustic feedback frequencies are used to filter the external input signals S that are externally supplied.

The sound signals (noise signals) in the predetermined frequency bands, the sound signals being extracted by the BPFs 822(1), 822(2), and 822(3), are supplied to the corresponding level check sections 823(1), 823(2), and 823(3).

Upon receiving the band-limited sound signals (noise signals) from the corresponding BPFs 822(1), 822(2), 822(3), the level check sections 823(1), 823(2), and 823(3) detect signal levels of the sound signals. The level check sections 823(1), 823(2), and 823(3) then supply the detected signal levels to the determination and control section 83.

Thus, the signal level of the external input signals S which is supplied from the level check section 821 and the signal levels of the sound signals in predetermined bands (in which acoustic feedback is likely to occur) of the external input signals S, the latter signal levels being supplied from the level check sections 823(1), 823(2), and 823(3), are supplied to the determination and control section 83.

The determination and control section 83 in the noise canceling system according to the second embodiment first determines whether or not there is a possibility that acoustic feedback is occurring, on the basis of the signals from the processor 81 for the all-band signals G.

In addition, on the basis of the signals supplied from the processor 82 for the external input signals S, the determination and control section 83 determines whether or not the external input signals S contain a periodic signal component, as in acoustic-feedback signals.

Thus, when it is determined based on the signals from the processor 82 for the external input signals S that the external input signals S are originally periodic, the determination and control section 83 determines that no acoustic feedback is occurring. In the manner described above, the accuracy of the acoustic-feedback detection is increased.

Figure 9A:
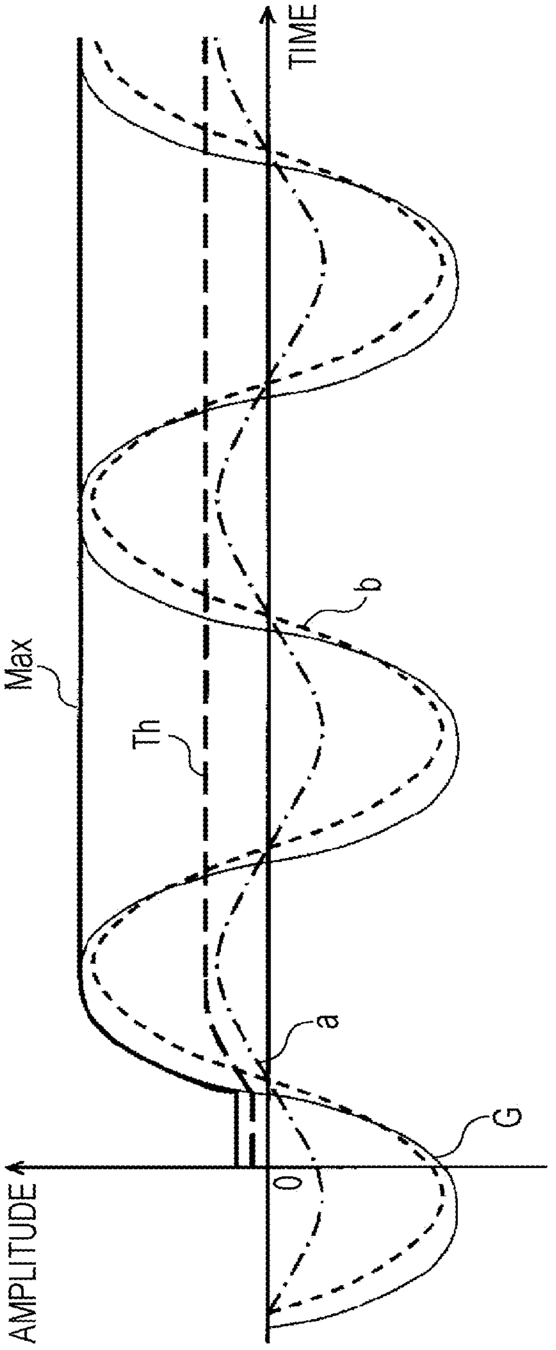
FIGS. 9A and 9B are diagrams illustrating a method for determining whether or not acoustic feedback is occurring, the determination being made by the acoustic-feedback detection/control section.
Figure 9B:
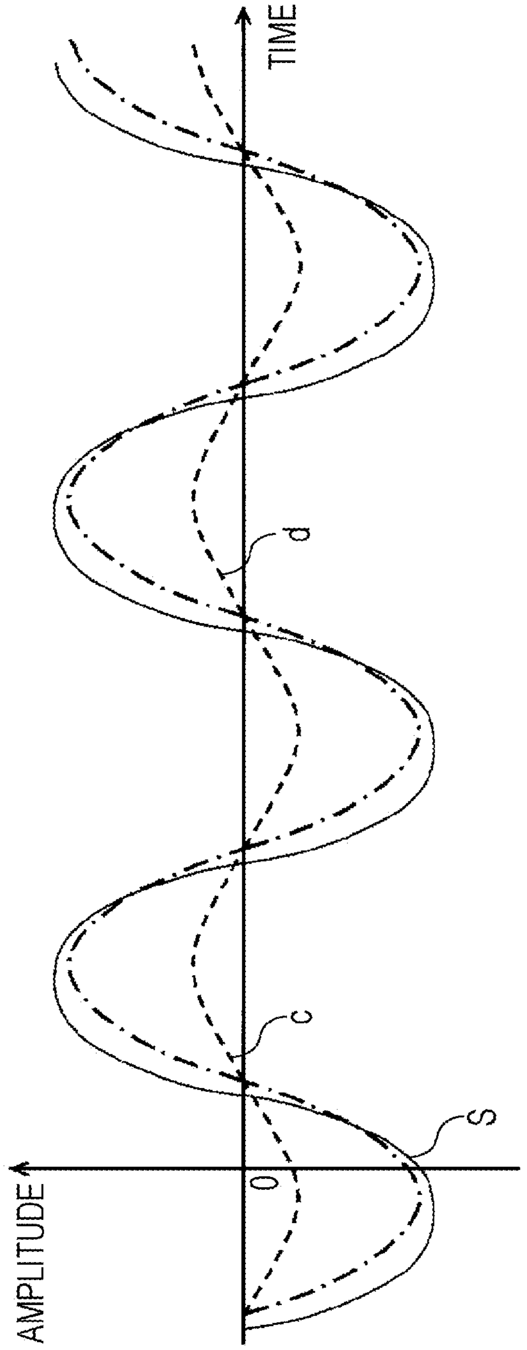

FIGS. 9A and 9B are diagrams illustrating a method for determining whether or not acoustic feedback is occurring, the determination being made by the acoustic-feedback detection/control section 18 in the noise canceling system according to the second embodiment.

FIG. 9A is a diagram illustrating a signal waveform for the all-band signals G, which are microphone input signals, and FIG. 9B is a diagram illustrating a signal waveform for the external input signals S. In FIGS. 9A and 9B, the horizontal axis indicates time and the vertical axis indicates signal amplitude.

As described above, the sound signals typically have quite complicated waveforms, whereas the acoustic-feedback signals have periodic waveforms. For ease of illustration of the periodic waveforms and for simplification of description, the all-band signals G and the external input signals S are also shown in FIGS. 9A and 9B as having periodic waveforms.

FIG. 9A shows a characteristic that is similar to FIG. 5 described above in the first embodiment. That is, a waveform shown by a narrow solid line in FIG. 9A represents the all-band signals (source microphone input signals) G collected by the microphone 111. A waveform shown by a thick line in FIG. 9A represents the waveform of the all-band maximum value Max of the all-band signals G.

The waveform of the all-band maximum value Max can be simply determined by connecting peak points of the all-band signals G, as described above in the first embodiment. The waveform of the all-band maximum value Max can also be determined by an appropriate method, such as using a largest peak value of the all-band signals G as the maximum value Max or using the average of the peak values of the all-band signals G as the maximum value Max.

As shown in FIG. 9A, a threshold Th, which is used to determine whether or not acoustic feedback is occurring, is set based on the all-band maximum value Max. The threshold Th is set based on the all-band maximum value Max so as to have, for example, several tens of percentages of the all-band maximum value Max, as in the case of the first embodiment.

For example, when the amplitude of the microphone input signals (noise signals) filtered and extracted by the BPF 812 (1) is smaller than or equal to the threshold Th, as shown by a waveform a indicated by a dashed-dotted line in FIG. 9A, it is determined that no acoustic feedback is occurring in the band.

In contrast, when the microphone input signals (noise signals) filtered and extracted by the BPF 812(1) are periodic signals whose amplitude is greater than the threshold Th, as shown by a waveform b indicated by a dotted line in FIG. 9A, it is determined that there is a possibility that acoustic feedback is occurring in the band. That is, at this stage, this is still only a possibility of occurrence of acoustic feedback, and thus, it is not yet determined that acoustic feedback is actually occurring.

With respect to the in-band noise signals extracted by the BPF 812(2) and BPF 812(3), a determination is also made as to whether or not acoustic feedback is occurring in the correspond bands, as in the case of the noise signals extracted by the BPF 172(1).

In the second embodiment, as shown in FIG. 9A, even when the all-band signals G have a value of 0 or smaller, the minimum value of the all-band maximum value Max and the minimum value of the threshold Th are set so as to be larger than 0s, as in the first embodiment described above with reference to FIG. 5. This is aimed to prevent false detection of acoustic feedback.

In the second embodiment, for example, observation of a wavelength between zero-crossing points also makes it possible to determine whether or not the filtered microphone input signals (noise signals) change periodically. Needless to say, for example, a determination may also be made as to whether or not the filtered microphone input signals (noise signals) are periodic on the basis of the period of appearance of the peak points.

In the noise canceling system according to the second embodiment, as described above, the external input sound signals S are also considered to determine whether or not acoustic feedback is occurring.

As described above, FIG. 9B is a diagram showing a signal waveform for the external input signals S. A waveform shown by a narrow solid line in FIG. 9B represents the external input signals S supplied from, for example, a music playback apparatus or the like.

For example, when the amplitude of the external input signals filtered and extracted by the BPF 822(1) is substantially equal to the amplitude of the original external input signals S, as shown by a waveform c indicated by a dashed-dotted line in FIG. 9B, it is determined that there is no possibility that acoustic feedback is occurring.

That is, when the signals filtered by the BPF 822(1) have an amplitude that is substantially equal to the amplitude of the original external input signals S, it can be determined that the signals filtered by BPF 822(1) are different from those that cause acoustic feedback, since the original external input signals S themselves are periodic.

For example, when the amplitude of the external input signals filtered and extracted by the BPF 812(1) is significantly smaller than the amplitude of the original external input signals S, as shown by a waveform d indicated by a dotted line in FIG. 9B, the presence/absence of acoustic feedback is determined in accordance with a result of analysis of the all-band signals G.

When the amplitude of the filtered external input signals is significantly lower than the amplitude of the original external input signals S, as in the waveform d indicated by a dotted line in FIG. 9B, it can be determined that the original external input signals S are not periodic.

With respect to the in-band external input signals extracted by the BPFs 822(2) and 822(3), a determination is made as to whether or not there is a possibility that acoustic feedback is occurring in the correspond bands, as in the case of the external input signals extracted by the BPF 822(1).

As described above, the external input signals S are filtered in the target frequency bands, the amplitudes of the filtered signal waveforms and the amplitudes of the signal waveforms of the original external input signals S are compared with each other to thereby make it possible to determine whether or not the external input signals are those that cause acoustic feedback or those that are original external input signals. With this arrangement, it is possible to more accurately determine whether or not acoustic feedback is occurring.

Comparison between the amplitude of the signals filtered by the BPFs 822(1), 822(2), and 822(3) and the amplitude of the external input signals S makes it possible to determine whether or not the external input signals S themselves contain a periodic signal component that is similar to a signal component of acoustic feedback. The present invention, however, is not limited to this arrangement.

As in the case in which the all-band signals G are to be processed, the maximum value of the external input signals S is determined and is used as a reference. For example, when the filtered signals have an amplitude that is 80% or more of the maximum value of the external input signals S, it is determined that the external input signals S themselves are periodic.

Also, for example, when the filtered signals have an amplitude that is lower than 80% of the maximum value of the external input signals S, it is determined that the external input signals S themselves do not have a periodicity that can be mistaken as acoustic feedback.

As described above, needless to say, a determination as to whether or not the external input signals S are periodic signals may be made based on the maximum value of the external input signals S and the filtered signals of the external input signals S.

[Specific Example of Operation of Acoustic-Feedback Detection/Control Section 18]

A specific example of the operation of the acoustic-feedback detection/control section 18 provided in the noise canceling system (described above with reference to FIGS. 8 and 9) according to second embodiment will be described next with reference to a flow chart shown in FIG. 10.

Figure 10:
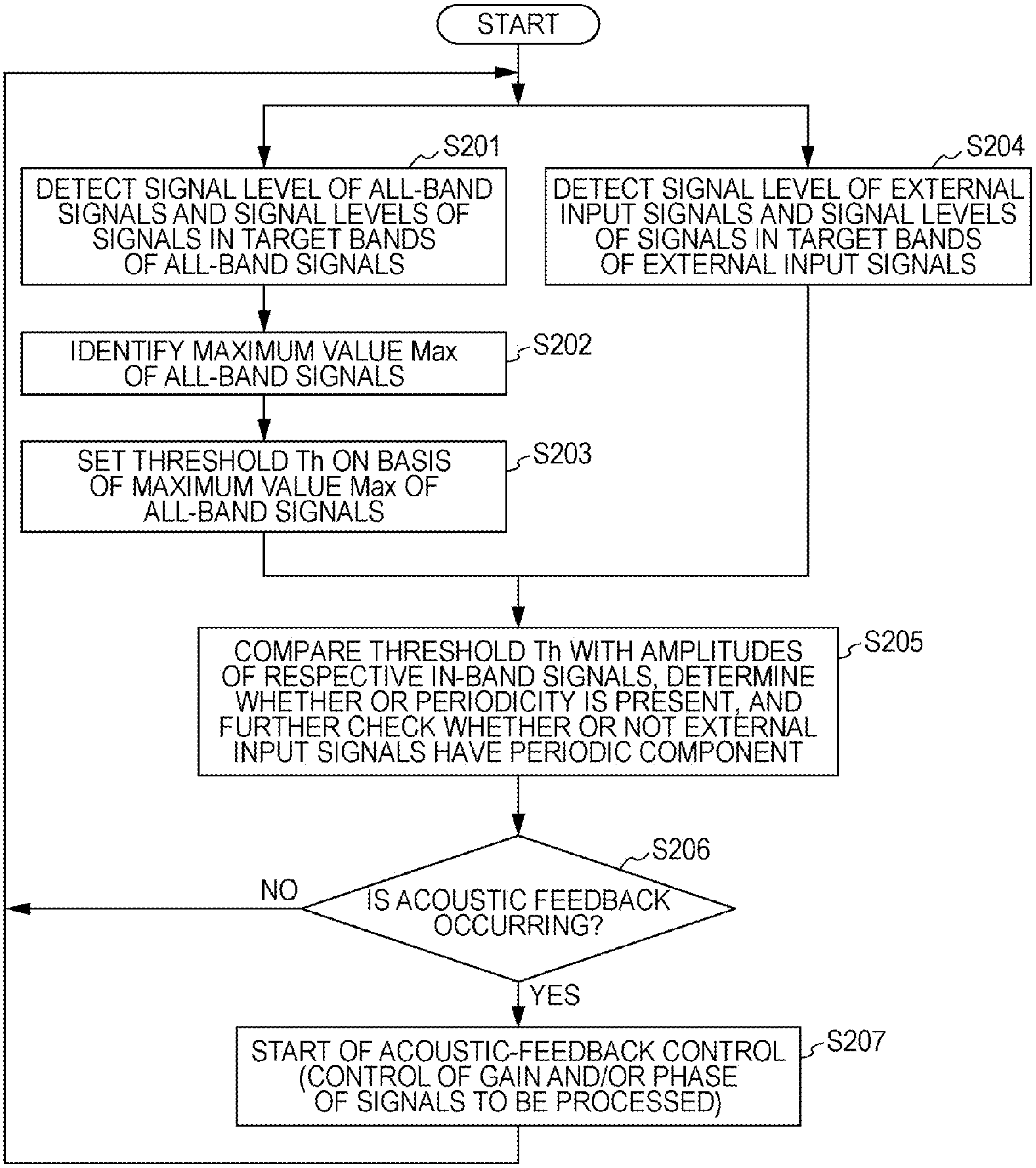
FIG. 10 is a flowchart illustrating a specific example of the operation of the acoustic-feedback detection/control section.

FIG. 10 is a flowchart illustrating a specific example of the operation of the acoustic-feedback detection/control section 18 according to the second embodiment. Processing shown in FIG. 10 is executed, for example, when the noise canceling system according to the second embodiment is powered on.

In step S201, the acoustic-feedback detection/control section 18 detects a signal level of the all-band signals G and signal levels of filtered signals in the target frequency bands of the all-band signals G and supplies the detection results to the determination and control section 83. To realize the processing in step S201, the level check section 811, the BPFs 812(1), 812(2), and 812(3), and the level check sections 813 (1), 813(2), and 813(3) function in cooperation with each other.

In step S202, the determination and control section 83 identifies the maximum value Max of the all-band signals, on the basis of the waveform of the supplied signal level of the all-band signals G. Next, in step S203, on the basis of the maximum value Max identified in step S202, the determination and control section 83 sets a threshold Th used for determining whether or not acoustic feedback is occurring.

In step S204, in parallel with the processing in steps S201 to S203 described above, the acoustic-feedback detection/control section 18 detects a signal level of the external input signals S and signal levels of filtered signals in the respective target frequency bands of the external input signals S and supplies the detection results to the determination and control section 83. To realize the processing in step S204, the level check section 821, the BPFs 822(1), 822(2), and 822(3), and the level check sections 823(1), 823(2), and 823(3) function in cooperation with each other.

In step S205, the determination and control section 83 determines whether or not there is a possibility that acoustic feedback is occurring, on the basis of analysis of the all-band signals G, and also checks whether or not the external input signals S have a periodic component (element), on the basis of a result of the analysis of the external input signals S.

Specifically, in step S205, the determination and control section 83 performs processing for comparing the threshold Th set in step S203 with the signal levels of the signals in the predetermined bands of the all-band signals G, the signals levels being detected in step S201 and being supplied from the level check sections 813(1), 813(2), and 813(3), and also determines whether or not the respective-in-band signals is periodic.

In addition, in step S205, the determination and control section 83 compares the signal level of the external input signals S which is detected in step S204 with the signal levels of the signals in the predetermined bands of the external input signals S, the signal levels being detected by the level check sections 813(1), 813(2), and 813(3), to thereby check whether or not the external input signals S themselves have a periodic component (periodic property).

In step S206, on the basis of a determination result and checking result obtained in step S205, the determination and control section 83 determines whether or not acoustic feedback is occurring.

The determination processing performed by the determination and control section 83 in step S206 involves determinations as follows. That is, as described above with reference to FIGS. 9A and 9B, the determination and control section 83 first determines whether or not the amplitude of the filtered signals of the all-band signals G is greater than the threshold Th determined based on the maximum value Max of the all-band signals G and whether or not the filtered signals are periodic signals.

In this case, when the amplitude of the filtered signals of the all-band signals G is greater than the threshold Th and the filtered signals are periodic signals, the determination and control section 83 further determines whether or not the external input signals S are periodic signals.

When it is determined that the amplitude of the filtered signals of the all-band signals G is greater than the threshold Th, the filtered signals are periodic signals, and the external input signals S are not periodic signals, the determination and control section 83 determines that acoustic feedback is occurring.

Otherwise, the determination-control section 83 determines that no acoustic feedback is occurring. For example, when the amplitude of the filtered signals of the all-band signals G is greater than the threshold Th, the filtered signals are periodic signals, and the external input signals S are not periodic signals, the determination and control section 83 determines that no acoustic feedback is occurring.

When the determination and control section 83 determines that no acoustic feedback is occurring in the determination processing in step S206, processing in step S201 and the steps subsequent thereto is repeated.

When the determination and control section 83 determines that acoustic feedback is occurring in the determination processing in step S206, the process proceeds to step S207 in which the determination and control section 83 starts control processing for preventing acoustic feedback.

More specifically, in step S207, the determination and control section 83 performs processing for generating a control signal CT for causing the FB filter circuit 12 to adjust the gain and/or the phase of signals and for supplying the control signal CT to the FB filter circuit 12. Thereafter, the acoustic-feedback detection/control section 18 repeats the processing in step S201.

As described above, the noise canceling system according to the second embodiment can more accurately determine whether or not acoustic feedback is occurring by not only considering the all-band signals G, which are microphone input signals collected by the microphone 111, but also the external input signals S.

Upon detecting that acoustic feedback is occurring, the noise canceling system can undermine the oscillation conditions by controlling the gain and/or the phase of the microphone input signals to thereby prevent acoustic feedback.

When acoustic feedback is occurring, the noise canceling system according to the second embodiment also controls the FB filter circuit 12 to adjust the gain and/or the phase of the microphone input signals so as to undermine the oscillation conditions, thereby preventing acoustic feedback. The present invention, however, is not limited to this arrangement.

In the noise canceling system according to the second embodiment, the arrangement may also be such that a gain control circuit and/or a phase control circuit, such as a delay circuit, for sound signals is provided at a portion between the microphone and microphone-amplifier section 11 and the driver 15 and is controlled. Needless to say, only one of the gain control circuit and the phase control circuit or both of the circuits may be provided.

As in the noise canceling system according to the first embodiment, the acoustic-feedback detection/control section 18 in the noise canceling system according to the second embodiment described above is adapted to extract signals in three different frequency bands. The present invention, however, is not limited to this arrangement.

Depending on the audio system, the number of frequency bands in which acoustic feedback can occur may be 4, 5, or the like, which is greater than 3. In such a case, according to the number of frequency bands to be extracted, the number of BPFs and the number of level check sections that receive signals supplied from the BPFs, the BPFs and the level check sections being included in the acoustic-feedback detection/control section 18, may be increased.

When the number of frequency bands in which acoustic feedback can occur is limited to 1 or 2, the number of BPFs and the number of level check sections that receive signals supplied from the BPF(s) can also be reduced to configure the acoustic-feedback detection/control section 18.

[Other Examples]

Although the description in the first and second embodiments has been given of an example in which the present invention is applied to the feedback-type noise canceling system, the present invention is not limited thereto. The present invention can also be applied to a feedforward-type noise canceling system.

This is because a feedforward-type noise canceling system may have a sound-signal system in which a microphone and a speaker are connected and thus may form a feedback loop in which sound output from the speaker is collected by the microphone. A description will now be given of an example in which the present invention is applied to such a feedforward-type noise canceling system.

[Feedforward-Type Noise Canceling System]

Next, a description will be given of a feedforward-type noise canceling system.

Figures 11, 12:
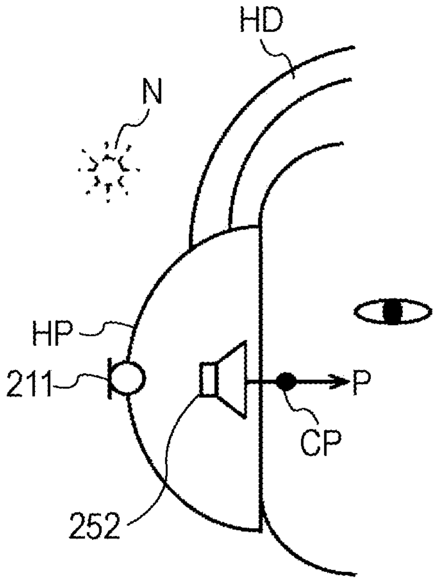
FIG. 11 is a diagram illustrating an overview of a feedforward-type noise canceling system.
FIG. 12 illustrates calculation expressions showing characteristics of the feedforward-type noise canceling system.

FIG. 11 is a diagram showing the configuration of a right-channel-side of a headphone system using a feedforward-type noise canceling system when the headphone system is placed on a user's head (the head of a user (listener)) HD.

Figure 13:
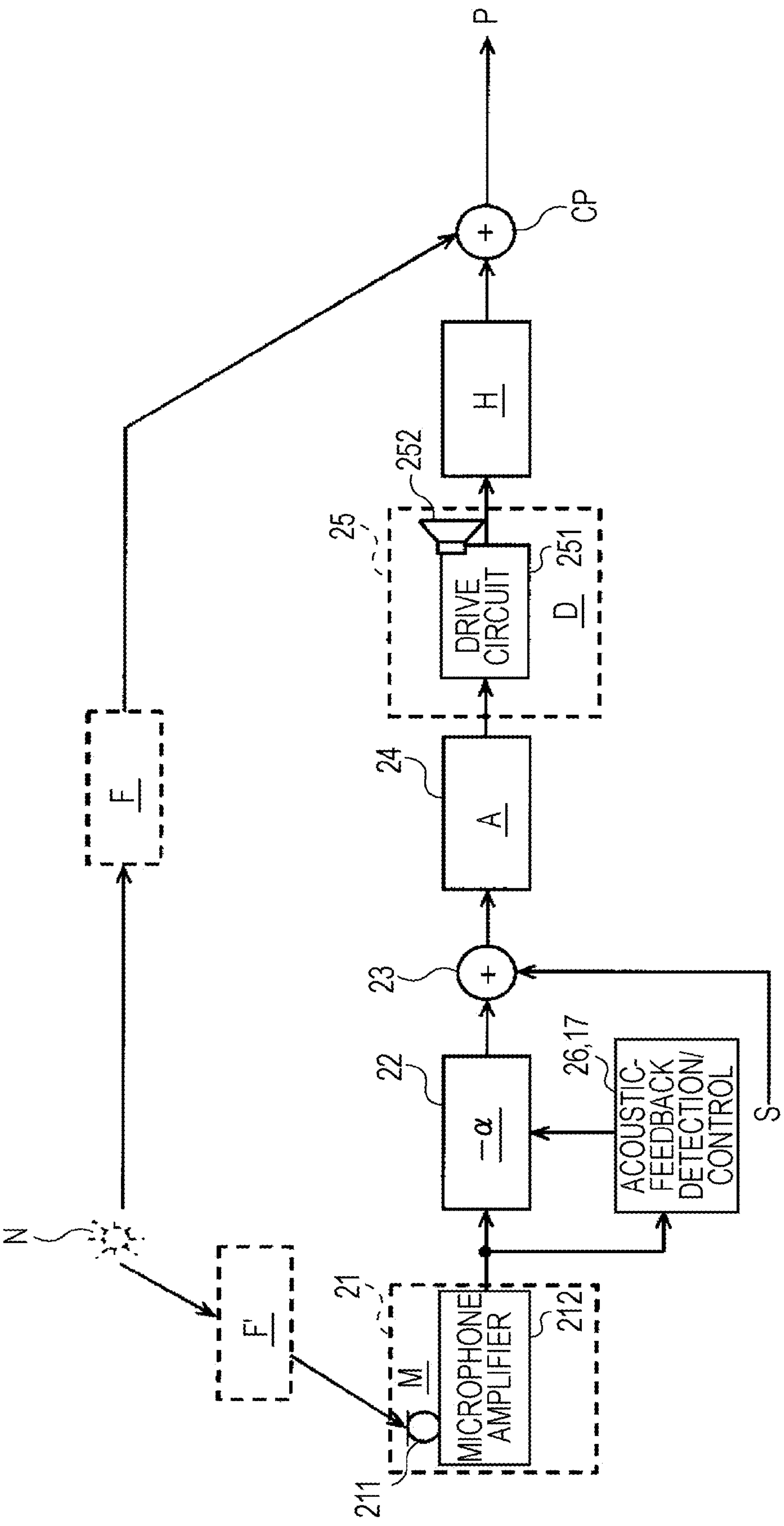
FIG. 13 is a diagram showing an overview of the configuration of the feedforward-type noise canceling system.

FIG. 12 illustrates calculation expressions indicating characteristics of the feedforward-type noise canceling system and FIG. 13 is a block diagram showing an overall configuration of the feedforward-type noise canceling system.

In the feedforward system, a microphone 211 is basically disposed outside a headphone housing HP, as shown in FIG. 11. Appropriate filtering is applied to noise collected by the microphone 211 and a driver 25 (shown in FIG. 13) in the headphone housing HP reproduces the resulting signals so as to cancel the noise at a position that is adjacent to the ear.

Character N in FIG. 11 represents an external noise source. Character P represents a sound pressure (output sound) that reaches the ear of the listener. A main reason why noise resulting from the noise source N enters the headphone housing HP is the same as that described in conjunction with the above-described feedback-type noise canceling system.

In the feedforward-type noise canceling system having the configuration shown in FIG. 11, the microphone 211 is disposed outside of the headphone housing HP and a speaker 252 is disposed inside the headphone housing HP.

The possibility of occurrence of acoustic feedback is low compared to the feedback-type noise canceling system in the first and second embodiments described above. However, the feedforward-type noise canceling system has a possibility that acoustic feedback can occur when the headphone housing HP is removed from the head of the user.

In addition, when sound output from the speaker 252 in the headphone housing HP leaks to the outside the housing HP or when vibration output from the speaker 252 propagates to the microphone 211, acoustic feedback may occur.

Thus, application of the present invention to the feedforward-type noise canceling also makes it possible to suppress occurrence of acoustic feedback.

The feedforward-type noise canceling system will now be described in more detail with reference to calculation expressions shown in FIG. 12 and a block diagram shown in FIG. 13. The feedforward-type noise canceling system shown in FIG. 13 includes a microphone and microphone-amplifier section 21 having the microphone 211 and a microphone amplifier 212.

This noise canceling system further includes a filter circuit (hereinafter referred to as an "FF filter circuit") 22 designed for feedforward control, a combining section 23, a power amplifier 24, and a driver 25. The driver 25 has a drive circuit 251 and the speaker 252.

In the feedforward-type noise canceling system shown in FIG. 13, characters A, D, M shown in the blocks represent transfer functions of the power amplifier 24, the driver 25, and the microphone and microphone-amplifier section 21, respectively.

In FIG. 13, character N represents an external noise source and character P indicates a sound pressure (output sound) that reaches the ear of the listener. In FIG. 13, character F represents a transfer function from the position of the external noise source N to the ear position CP (a transfer function between the noise source and a cancel point).

In FIG. 13, character F' represents a transfer function from the noise source N to the microphone 211 (a transfer function between the noise source and the microphone). Also, character H represents a transfer function from the driver 25 to the cancel point (ear position) CP (a transfer function between the driver and the cancel point).

When a transfer function of the FF filter circuit 22, which serves as a core for the feedforward-type noise canceling system, is represented by —α, a sound pressure P (output sound) in FIG. 13 which reaches the listener's ear can be given as expression (1) shown in FIG. 12.

When an ideal state is considered, the transfer function F between the noise source N and the cancel point CP can be given as expression (2) in FIG. 12. Substitution of expression (2) in FIG. 12 into expression (1) in FIG. 12 cancels out the first term and the second term.

As a result, in the feedforward-type noise canceling system shown in FIG. 13, output sound P can be given as in expression (3) in FIG. 12. As can be understood from expression (3) in FIG. 12, noise is canceled and only music signals (or sound signals and so on to be listened to) remain, so that sound that is similar to sound obtained with a typical headphone operation can be listened to.

In practice, however, it is difficult to achieve a complete filter configuration having transfer functions that completely satisfy expression (2) shown in FIG. 12. In particular, for example, the shape of the ear varies depending on the individual person, and the headphone placement state also varies, and thus a difference between individuals is large.

Characteristics also vary depending on, for example, the position of noise and the position of the microphone. For the reasons described above, the active noise reduction processing is not generally performed on the middle and high frequencies and the headphone housing is used to provide passive sound shielding.

Expression (2) in FIG. 12 means, as is apparent therefrom, the transfer function from the noise source N to the ear position is simulated by an electrical circuit including a transfer function α.

In this feedback system, while satisfying expression (2) in FIG. 12, a designer designs the filters considering human acoustic characteristics. The filter design considering the human acoustic characteristics is in many cases evaluated by the designer himself/herself. Many feedforward-type noise canceling headphones have been developed and sold, and can be said to be widely available on the market.

The cancel point CP in the feedforward-type noise canceling system shown in FIGS. 11 and 13 can be set at an arbitrary ear position of the listener, as shown in FIG. 11, unlike the feedback-type noise canceling system shown in FIG. 1.

In general, however, the transfer function α is stationary and, at the design stage, rough estimation is performed aimed at some type of target characteristic. Yet, since the ear shape varies for each listener, there are cases in which a sufficient noise canceling effect is not obtained, noise components are summed in non-inverted phase, or abnormal sound is produced.

For the reasons described above, in general, the feedforward system is highly stable since the possibility of oscillation is low, but it is difficult to provide a sufficient amount of attenuation. On the other hand, in the feedback system, a large amount of attenuation can be expected, but instead, the stability of the system should be paid attention to. That is, the feedback system and the feedforward system have respective different characteristics.

As described above, the feedforward-type noise canceling system described above with reference to FIGS. 11 to 13 can also have a sound-signal system in which the microphone and the speaker are connected.

Thus, the feedforward-type noise canceling system also has a possibility of causing acoustic feedback, although it is stable compared to the feedback-type noise canceling system, as described above. Accordingly, as shown in FIG. 13, the feedforward-type noise canceling system also has an acoustic-feedback detection/control section 26.

The acoustic-feedback detection/control section 26 has a configuration that is similar to that of the acoustic-feedback detection/control section 17 used for the feedback-type noise canceling system in the first embodiment described above with reference to FIG. 4.

In the case of the acoustic-feedback detection/control section 26 in this example, on the basis of the signal level of the microphone input signals (all-band signals) G from the microphone amplifier 212, the maximum value Max of all-band signals G is also determined and the threshold Th is set, as described above with reference to FIGS. 4 to 6.

The acoustic-feedback detection/control section 26 then detects, from the all-band signals G, a signal level of the signals in the target frequency bands in which the possibility of occurrence of acoustic feedback is high in the noise canceling system.

The acoustic-feedback detection/control section 26 then compares the set threshold Th with the amplitude of the signals in the target frequency bands, and also determines whether or acoustic feedback is occurring, considering whether or not the signals in the target frequency bands are periodic.

When it is determined that acoustic feedback is occurring, the acoustic-feedback detection/control section 26 controls the FF filter circuit 22 to control the gain and/or the phase of the microphone input signals (all-band signals) G to undermine the oscillation conditions, thereby preventing acoustic feedback.

As described above, in the feedforward-type noise canceling system, the microphone input signals (all-band signals) G collected by the microphone 211 are analyzed to determine whether or not acoustic feedback is occurring, to thereby make it possible to suppress acoustic feedback.

Figure 14:
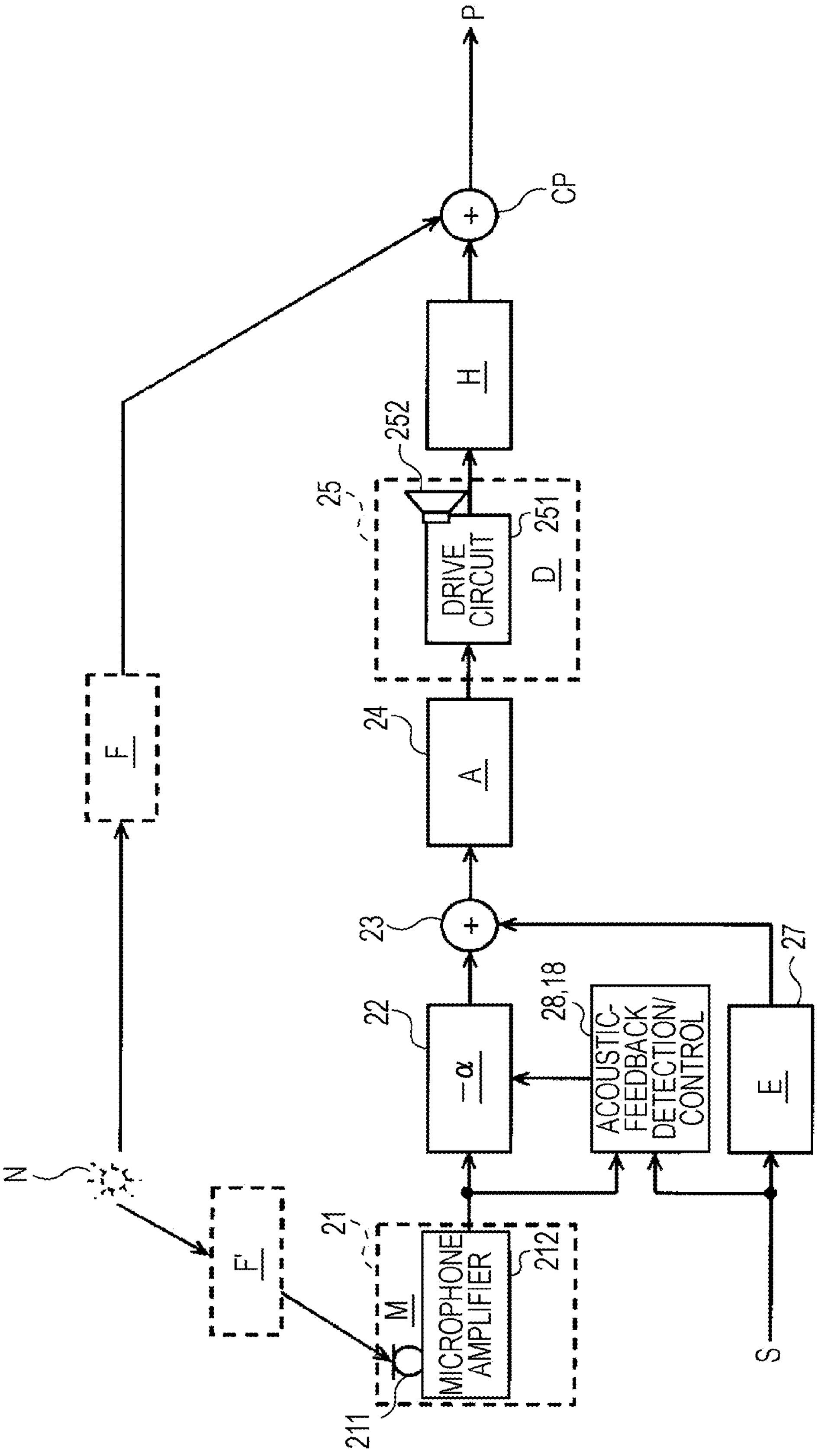
FIG. 14 is a diagram showing another example of the configuration of the feedforward-type noise canceling system.

FIG. 14 is a diagram showing another example of the configuration of a feedforward-type noise canceling system. As shown in FIG. 14, an acoustic-feedback detection/control section 28 that also considers the external input signals S can be provided so as to more accurately determine whether or not acoustic feedback is occurring.

In FIG. 14, sections that are configured similarly to those in the feedforward-type noise canceling system shown in FIG. 13 are denoted by the same reference characters, and detailed descriptions thereof are omitted.

In the case of the feedforward-type noise canceling system shown in FIG. 14, the input signals S are externally supplied to a combining section 23 via an equalizer 27. Character E in the block of the equalizer 27 represents a transfer function of the equalizer 27, the transfer function being multiplied to the external input signals S (such as music signals) of music to be listened to.

As shown in FIG. 14, microphone input signals (all-band signals) G from a microphone amplifier 212 and the external input signals S are supplied to the acoustic-feedback detection/control section 28. The acoustic-feedback detection/control section 28 in this example has a configuration that is similar to that of the acoustic-feedback detection/control section 18 of the second embodiment described above with reference to FIGS. 8 to 10 and functions in the same manner.

That is, in the case of the acoustic-feedback detection/control section 28 in this example, on the basis of the signal level of the microphone input signals (all-band signals) G from the microphone amplifier 212, the maximum value Max of the all-band signals G is determined and the threshold Th is set, as described above with reference to FIGS. 8 to 10.

The acoustic-feedback detection/control section 28 then detects, from the all-band signals G, a signal level of signals in the target frequency bands in which the possibility of occurrence of acoustic feedback is high in the noise canceling system.

The acoustic-feedback detection/control section 28 then compares the set threshold Th with the amplitude of the signals in the target frequency bands, and also determines whether or not there is a possibility that acoustic feedback is occurring, considering whether or not the signals in the target frequency bands are periodic.

In addition, the acoustic-feedback detection/control section 28 in this example detects a signal level of the external input signals S and also detects, from the external input signals S, signal levels of signals in the target frequency bands in which the possibility of occurrence of acoustic feedback is high in the noise canceling system.

The acoustic-feedback detection/control section 28 then compares the set threshold Th with the amplitudes of the signals in the target frequency bands, and also determines whether or not there is a possibility that acoustic feedback is occurring, considering whether or not the signals in the target frequency bands are periodic.

In addition, the acoustic-feedback detection/control section 28 further compares the waveform of the signal level of the external input signals S with the waveforms of the signal levels of the signals in the target frequency bands, the latter signal levels being extracted from the external input signals, and determines whether or not the external input signals S originally contain a periodic signal component that can be mistaken as acoustic feedback.

The acoustic-feedback detection/control section 28 analyzes the all-band signals G to determine that there is a possibility of acoustic feedback. When it is determined that the external input signals S themselves do not have a periodic component that can be mistaken as acoustic housing, the acoustic-feedback detection/control section 28 determines that acoustic feedback is occurring.

In the manner described above, when it is determined that acoustic feedback is occurring, the acoustic-feedback detection/control section 28 controls the FF filter circuit 22 to control the gain and/or the phase of the microphone input signals (all-band signals) G to undermine the oscillation conditions, thereby preventing acoustic feedback.

As described above, in the feedforward-type noise canceling system, not only the all-band signals G (which are the microphone input signals) but also the external input signals S are considered to accurately determine whether or not acoustic feedback is occurring, thereby making it possible to suppress acoustic feedback.

In the feedforward-type noise canceling system described above with reference to FIGS. 11 to 14, when acoustic feedback is occurring, the FF filter circuit 22 is controlled to stop the acoustic feedback. The present invention, however, is not limited to this arrangement.

In the example described above with reference to FIGS. 11 to 14, the arrangement may also be such that a gain control circuit and/or a phase control circuit, such as a delay circuit, for sound signals is provided at a portion between the microphone and microphone-amplifier section 21 and the driver 25 and is controlled. Needless to say, only one of the gain control circuit and the phase control circuit or both of the circuits may be provided.

In the above description, the acoustic-feedback detection/control section 26 shown in FIG. 13 has a configuration that is similar to the acoustic-feedback detection/control section 17 in the first embodiment and the acoustic-feedback detection/control section 26 shown in FIG. 14 has a configuration that is similar to the acoustic-feedback detection/control section 18 in the second embodiment. The present invention, however, is not limited to this arrangement.

Depending on the audio system, the number of frequency bands in which acoustic feedback can occur may be 4, 5, or the like, which is greater than 3. In such a case, according to the number of frequency bands to be extracted, the number of BPFs and the number of level check sections that receive signals supplied from the BPFs, the BPFs and the level check sections being included in the acoustic-feedback detection/control section 26 and 28, may be increased.

When the number of frequency bands in which acoustic feedback can occur is limited to 1 or 2, the number of BPFs and the number of level check sections that receive signals supplied from the BPF(s) can also be reduced to configure the acoustic-feedback detection/control sections 26 and 28.

[Realization of Method according to the Present Invention]

In the above-described embodiment, the processing performed by the acoustic-feedback detection/control section 17 shown in FIG. 4 and the acoustic-feedback detection/control section 18 shown FIG. 8 corresponds to processing in corresponding steps according to a method of an embodiment of the present invention.

More specifically, the processing shown in the flowcharts shown in FIGS. 6 and 10 is processing to which the method according to the embodiment of the present invention is applied. Thus, the processing described above can also be achieved by the method according to the embodiment of the present invention.

[Modifications]

In the above-described embodiments, the function of first level detecting means is realized by the level check sections 171 or 811. The function of extracting means is realized by the BPFs 172(1), 172(2), and 172(3) or the BPFs 812(1), 812(2), and 812(3).

The function of second level detecting means is realized by the level check sections 173(1), 173(2), and 173(3) or the level check sections 813(1), 813(2), and 813(3). The function of determining means is realized by the determination and control section 174 or the determination and control section 83.

The function of third level detecting means is realized by the level check section 821. The function of second extracting means is realized by the BPFs 822(1), 822(2), and 822(3). The function of fourth level detecting means is realized by the level check sections 823(1), 823(2), and 823(3).

The function of adjusting means is realized by the FB filter circuit 12 and the function of controlling means is realized by the determination and control section 174 or the determination and control section 83.

As described above, signals of target bands are extracted from the all-band signals G, which are microphone input signals, in order to determine whether or not acoustic feedback is occurring. As a result, it is possible to recognize in which band acoustic feedback is occurring. Accordingly, gain and/or phase adjustment may be performed on sound signals in the band in which acoustic feedback is occurring. With this arrangement, it is possible to effectively prevent acoustic feedback and it is possible to reduce the amount of influence on sound signals to be processed.

The description in the above embodiments has been given of a case in which the FB filter circuit 12 or the FF filter circuit 22 performs gain and/or phase adjustment. More specifically, the FB filter circuit 12 and/or the FF filter circuit 22 may change at least one of, for example, the center frequency, sharpness, gain characteristic, and phase characteristic to undermine the oscillation conditions.

Needless to say, the present invention is not limited to an arrangement in which the FB filter circuit 12 or the FF filter circuit 22 performs the adjustment. For example, at least one of the center frequency, sharpness, gain characteristic, and phase characteristic with respect to sound signals may be changed at a position between the microphone and the speaker.

Although the description in the above embodiments has been given of a case in which the gain and/or the phase are adjusted as a method for preventing acoustic feedback, the present invention is not limited thereto. For example, it is possible to prevent acoustic feedback by using various methods, such as performing compressor-processing centering at a band in which acoustic feedback is occurring or muting sound signals in a band in which acoustic feedback is occurring. That is, various methods adapted to undermine the oscillation conditions can be used.

Although the description in the above embodiments has been given of an example in which the present invention is applied to the feedback-type noise canceling system and the feedforward-type noise canceling system, the present invention is not limited thereto.

The present invention can also be applied to another type of noise canceling system, for example, an adaptive-filter type noise canceling system.

The present invention is not limited to noise canceling systems, but is also applicable to sound-signal systems in which a microphone and a speaker are connected. For example, the present invention can be applied to the so-called “public address audio systems”, such as audio-visual systems and audio systems in concert halls.

The present invention can also be applied to a motion feedback speaker (MFB speaker) having a configuration for detecting the motion of the diaphragm of a speaker and feeding the detected motion back to input signals and an acoustic feedback speaker (AFB speaker) having a configuration in which sound output from a speaker is collected by a microphone and is feed back.

That is, the present invention can be applied to various audio systems that have feedback configurations in which sound or vibration output from a speaker is fed back to input signals of the speaker to thereby cause acoustic feedback.

The present application contains subject matter related to that disclosed in Japanese Priority Patent Application JP 2008-171937 filed in the Japan Patent Office on Jul. 1, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An acoustic-feedback detection apparatus comprising:

first level detecting means for detecting a first signal level of sound signals obtained from a position in a sound-signal system in which a microphone and speaker are connected;

extracting means for extracting, from the sound signals of which the first signal level is detected, signals in a band having a bandwidth predetermined for each of at least one predetermined center frequency;

second level detecting means for detecting a second signal level of the signals in each band, the signals being extracted by the extracting means;

determining means for determining whether or not acoustic feedback is occurring based on a threshold determined according to the first signal level detected by the first level detecting means and a waveform of each second signal level detected by the second level detecting means;

third level detecting means for detecting a third signal level of external sound signals to be supplied to a position in the sound-signal system;

second extracting means for extracting, from the external sound signals, signals in the band having the bandwidth predetermined for each of the at least one center frequency; and fourth level detecting means for detecting a fourth signal level of the signals in each band, the signals being extracted by the second extracting means;

wherein the determining means determines whether or not acoustic feedback is occurring based on a first output resulting from the detection performed by the third level detecting means and a second output resulting from the detection performed by the fourth level detecting means.

2. The acoustic-feedback detection apparatus according to claim 1, wherein a minimum value of the threshold is predetermined so as to have a value that is greater than zero.

3. The acoustic-feedback detection apparatus according to claim 2, further comprising:

adjusting means for adjusting, at a position in the sound-signal system, at least one of a gain and a phase of the sound signals; and controlling means for controlling the adjusting means based on a result of the determination performed by the determining means.

4. The acoustic-feedback detection apparatus according to claim 3, wherein the adjusting means is configured to perform adjustment on the signals for each bandwidth predetermined for each of the at least one center frequency, and the controlling means controls the adjusting means so as to perform adjustment on the sound signals in a band in which acoustic feedback is occurring.

5. An acoustic-feedback detection method comprising steps detecting a first signal level of sound signals obtained from a position in a sound-signal system in which a microphone and speaker are connected;

extracting, from the sound signals of which the first signal level is detected, signals in a band having a bandwidth predetermined for each of at least one predetermined center frequency;

detecting a second signal level of the signals in each band, the signals being extracted from the sound signals;

determining whether or not acoustic feedback is occurring based on a threshold determined according to the detected signal level of the sound signals and a waveform of the detected second signal level of the signals in each band;

detecting a third signal level of external sound signals to be supplied to a position in the sound-signal system;

extracting, from the external sound signals, signals in a band having a bandwidth predetermined for each of the at least one center frequency; and detecting a fourth signal level of the signals in each band, the signals being extracted from the external sound signals;

wherein in the determining step, whether or not acoustic feedback is occurring is determined based on a first result of the detection of the third signal level of the external sound signals and a second result of the detection of the fourth signal level of the signals in each band.

6. The acoustic-feedback detection method according to claim 5, wherein a minimum value of the threshold is predetermined so as to have a value that is greater than zero.

7. An acoustic-feedback detection apparatus comprising:

at least one processor;

a first level detecting section configured to detect a first signal level of sound signals obtained from a position in a sound-signal system in which a microphone and speaker are connected;

a first extracting section configured to extract, from the sound signals of which the first signal level is detected, signals in a band having a bandwidth predetermined for each of at least one predetermined center frequency;

a second level detecting section configured to detect a second signal level of the signals in each band, the signals being extracted by the first extracting section;

a determining section configured to determine whether or not acoustic feedback is occurring based on a threshold determined according to the first signal level detected by the first level detecting section and a waveform of each second signal level detected by the second level detecting section;

a third level detecting section configured to detect a third signal level of external sound signals to be supplied to a position in the sound-signal system;

a second extracting section configured to extract, from the external sound signals, signals in the band having the bandwidth predetermined for each of the at least one center frequency; and a fourth level detecting section configured to detect a fourth signal level of the signals in each band, the signals being extracted by the second extracting section;

wherein the determining section determines whether or not acoustic feedback is occurring based on a first output resulting from the detection performed by the third level detecting section and a second output resulting from the detection performed by the fourth level detecting section.

8. The acoustic-feedback detection apparatus according to claim 7, wherein a minimum value of the threshold is predetermined so as to have a value that is greater than zero.

9. The acoustic-feedback detection apparatus according to claim 8, further comprising:

an adjusting section configured to adjust, at a position in the sound-signal system, at least one of a gain and a phase of the sound signals; and a controlling section configured to control the adjusting section based on a result of the determination performed by the determining section.

10. The acoustic-feedback detection apparatus according to claim 9, wherein the adjusting section is capable of performing adjustment on the signals for each bandwidth predetermined for each of the at least one center frequency, and the controlling section controls the adjusting section so as to perform adjustment on the sound signals in a band in which acoustic feedback is occurring.

* * * * *